US008543778B2

(12) United States Patent
Emaru et al.

(10) Patent No.: US 8,543,778 B2
(45) Date of Patent: Sep. 24, 2013

(54) MANAGEMENT SYSTEM AND METHODS OF STORAGE SYSTEM COMPRISING POOL CONFIGURED OF ACTUAL AREA GROUPS OF DIFFERENT PERFORMANCES

(75) Inventors: Hironori Emaru, Yokohama (JP); Koichi Murayama, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 662 days.

(21) Appl. No.: 12/742,502

(22) PCT Filed: Jan. 28, 2010

(86) PCT No.: PCT/JP2010/000511
§ 371 (c)(1), (2), (4) Date: May 12, 2010

(87) PCT Pub. No.: WO2011/092738
PCT Pub. Date: Aug. 4, 2011

(65) Prior Publication Data
US 2012/0005435 A1 Jan. 5, 2012

(51) Int. Cl.
*G06F 12/00* (2006.01)
*G06F 13/00* (2006.01)
*G06F 13/28* (2006.01)

(52) U.S. Cl.
USPC ............ 711/154; 711/114; 711/165; 711/117

(58) Field of Classification Search
USPC ................................ 711/114, 117, 154, 165
See application file for complete search history.

(56) References Cited

U.S. PATENT DOCUMENTS

2004/0044854 A1 3/2004 Gibble et al.
2007/0079099 A1 * 4/2007 Eguchi .......................... 711/170
2009/0043982 A1 2/2009 Kano et al.

FOREIGN PATENT DOCUMENTS

JP 2003015915 A 1/2003
JP 2005537554 A 12/2005
JP 2007102455 A 4/2007

* cited by examiner

*Primary Examiner* — Matthew Bradley
*Assistant Examiner* — Rocio Del Mar Perez-Velez
(74) *Attorney, Agent, or Firm* — Volpe and Koenig, P.C.

(57) ABSTRACT

A storage system comprises multiple virtual volumes (VVOLs) and multiple pools. Each pool is configured of multiple actual area groups of different performances. The storage system accesses actual areas assigned to virtual areas identified by access commands from an access source. A controller manages pool condition information which is the information showing which actual area is assigned to which virtual area and the access load related to the virtual areas. The management system of the storage system comprises management information showing a performance requirement and a performance for each VVOL. The performance of a VVOL is the performance identified with reference to the pool condition information. The management system, with reference to the management information, identifies a VVOL whose condition is inappropriate and, for changing the condition of the identified VVOL from inappropriate to appropriate, performs migration procedure related to the pool made to correspond to the above-mentioned identified VVOL.

12 Claims, 25 Drawing Sheets

| POOL ID (501) | PAGE ID (502) | VVOL ID (503) | LAST ACCESS TIME (504) | ACCESS FREQUENCY (505) |
|---|---|---|---|---|
| POOL A | 00000 | VOL2 | 2009/12/5 16:01:46 | 12531 |
| | 00001 | VOL1 | 2009/12/5 16:49:10 | 2 |
| | 00002 | N/A | - | |
| | ... | ... | ... | ... |
| | 02000 | VOL2 | 2009/12/5 10:24:58 | 0 |
| | ... | ... | ... | ... |
| | 12000 | VOL3 | 2009/12/5 14:29:11 | 950 |
| | ... | ... | ... | ... |
| | 32000 | VOL1 | 2009/12/4 10:38:25 | 0 |
| | ... | ... | ... | ... |
| ... | ... | ... | ... | ... |

FIG. 6

| POOL ID | PAGE ID | MEDIA ID | MEDIA LBA | | VVOL ID | VVOLLBA | |
|---|---|---|---|---|---|---|---|
| | | | START | END | | START | END |
| POOL A | 00000 | M001 | 00000000 | 00000999 | VVOL2 | 01350000 | 01350999 |
| | 00001 | | 00001000 | 00001999 | VVOL1 | 00946000 | 00946999 |
| | 00002 | | 00002000 | 00002999 | N/A | - | - |
| | ... | | ... | ... | ... | ... | ... |
| | 02000 | M002 | 00000000 | 00000999 | VVOL2 | 00055000 | 00055999 |
| | ... | | ... | ... | ... | ... | ... |
| | 12000 | M003 | 00000000 | 00000999 | VVOL3 | 04398000 | 04398999 |
| | ... | | ... | ... | ... | ... | ... |
| | 32000 | M004 | 00000000 | 00000999 | VVOL1 | 00001000 | 00001999 |
| | ... | | ... | ... | ... | ... | ... |
| ... | ... | ... | ... | ... | ... | ... | ... |

| VOL ID (701) | CAPACITY (702) | TYPE (703) | POOL ID (704) |
|---|---|---|---|
| VVOL1 | 600GB | VVOL | POOL A |
| VVOL2 | 200GB | VVOL | POOL D |
| ... | ... | ... | ... |
| M001 | 50GB | SSD | N/A |
| M002 | 50GB | SAS | N/A |
| ... | ... | ... | ... |

| POOL ID (801) | MEDIA ID (802) | TIER TYPE (803) | ACCESS FREQUENCY LIMIT (804) | ACCESS FREQUENCY (805) |
|---|---|---|---|---|
| POOL A | M001 | HIGH | 200,000 | 145,000 |
| | M002 | MEDIUM | 18,000 | 9,600 |
| | M003 | MEDIUM | 18,000 | 12,000 |
| | M004 | LOW | 12,000 | 2,900 |
| ... | ... | ... | ... | ... |

| VVOL ID (1001) | SUBSYSTEM ID (1002) | POOL ID (1003) | SLO (1004) | CAPACITY (1005) | USED CAPACITY (1006) | PERFORMANCE (1007) |
|---|---|---|---|---|---|---|
| VVOL1 | SUB1 | POOL A | 8 | 600GB | 250GB | 6 |
| VVOL2 | SUB1 | POOL D | 4 | 200GB | 18GB | 2 |
| VVOL3 | SUB4 | POOL A | 12 | 1.2TB | 650GB | 9 |
| VVOL4 | SUB3 | POOL C | 15 | 6.0TB | 20GB | 10 |
| ... | ... | ... | ... | ... | ... | ... |

| TIER TYPE (1101) | MEDIA TYPE (1102) | SPEED (1103) | MAXIMUM ACCESS FREQUENCY (1104) | COST (1105) |
|---|---|---|---|---|
| HIGH | SSD | 1 | 25000 | 20 |
| MEDIUM | SAS | 10 | 2500 | 2 |
| LOW | SATA | 20 | 1250 | 1 |

FIG. 18

| VVOL ID (1001) | SUBSYSTEM ID (1002) | POOL ID (1003) | SLO (1004) | CAPACITY (1005) | USED CAPACITY (1006) | PERFOR-MANCE (1007) | ACCESS DISTRIBUTION (1008) | | (2004) |
|---|---|---|---|---|---|---|---|---|---|
| | | | | | | | 0-249 | ... | TOTAL |
| VVOL1 | SUB1 | POOL A | 8 | 600GB | 250GB | 6 | 5,000<br>16.7% | ... | 30,000<br>100% |
| VVOL2 | SUB1 | POOL D | 4 | 200GB | 18GB | 2 | 2,900<br>19.3% | ... | 15,000<br>100% |
| VVOL3 | SUB4 | POOL A | 12 | 1.2TB | 650GB | 9 | 650<br>21.7% | ... | 3,000<br>100% |
| VVOL4 | SUB3 | POOL C | 15 | 6.0TB | 20GB | 10 | 8,000<br>51.3% | ... | 15,600<br>100% |
| ... | ... | ... | ... | ... | ... | ... | ... | ... | ... |

| | WEIGHTING | SATA | SAS | SSD |
|---|---|---|---|---|
| PRESENT | 0.5 | 50 | 40 | 10 |
| 1 HOUR BEFORE | 0.25 | 47 | 43 | 10 |
| 6 HOURS BEFORE | 0.13 | 45 | 45 | 10 |
| 12 HOURS BEFORE | 0.07 | 55 | 40 | 5 |
| 24 HOURS BEFORE | 0.03 | 58 | 38 | 4 |
| 1 WEEK BEFORE | 0.02 | 57 | 37 | 6 |
| RESULT | | 49.33 | 41.28 | 9.39 |

FIG. 21

| 2111 VVOL ID | 2112 / 2101 ACCESS DISTRIBUTION | | | | 2113 TOTAL | 2114 MEDIA RATIO | | | 2117 PERFOR-MANCE | 2116 SLO |
|---|---|---|---|---|---|---|---|---|---|---|
| | 0-249 | 250-499 | ... | 2500- | | SSD | SAS | SATA | | |
| VVOL1 | 5,632 | 4,290 | ... | 153 | 30,000 | 10<br>->9 | 40<br>->38 | 50<br>->53 | 14.1<br>->14.5 | 18 |
| VVOL2 | 4,444 | 3,333 | ... | 111 | 22,000 | 9<br>->8 | 38<br>->37 | 53<br>->55 | 14.5<br>->14.8 | 18 |
| ... | ... | ... | ... | ... | ... | ... | ... | ... | ... | ... |
| VVOLX | 3,000 | 2,000 | ... | 30 | 18,000 | 10<br>->11 | 40<br>->43 | 50<br>->46 | 14.1<br>->13.6 | 16 |

FIG. 23

| | 100 | 200 | 300 | 400 | 500 | 600 | 700 | 800 | 900 | 1000 |
|---|---|---|---|---|---|---|---|---|---|---|
| VVOL1 | 0.6 | 0.08 | 0.04 | 0.04 | 0.04 | 0.04 | 0.04 | 0.04 | 0.04 | 0.04 |
| VVOL2 | 0.5 | 0.09 | 0.06 | 0.06 | 0.05 | 0.06 | 0.04 | 0.04 | 0.06 | 0.04 |
| VVOL3 | 0.2 | 0.2 | 0.2 | 0.1 | 0.05 | 0.1 | 0.05 | 0.05 | 0.03 | 0.02 |
| VVOL4 | 0.1 | 0.2 | 0.3 | 0.2 | 0.2 | 0.1 | 0 | 0 | 0 | 0 |

FIG. 25

| 2511 | 1001 | 2512 | 1002 | 1003 | 1004 | 2701 |
|---|---|---|---|---|---|---|
| APP ID | VVOL ID | LBA RANGE | SUBSYSTEM ID | POOL ID | SLO | ... |
| APP1 | VVOL1<br>VVOL3 | ALL<br>ALL | SUB1<br>SUB1 | POOL A<br>POOL A | 8 | ... |
| APP2 | VVOL4<br>VVOL5<br>VVOL6 | ALL<br>ALL<br>ALL | SUB1<br>SUB2<br>SUB2 | POOL D<br>POOL D<br>POOL D | 4 | ... |
| APP3 | VVOL2 | 0-<br>99,999 | SUB4 | POOL N | 12 | ... |
| APP4 | VVOL2 | 100,000-<br>200,000 | SUB4 | POOL N | 4 | ... |
| | ... | | ... | ... | ... | ... |

MANAGEMENT SYSTEM AND METHODS OF STORAGE SYSTEM COMPRISING POOL CONFIGURED OF ACTUAL AREA GROUPS OF DIFFERENT PERFORMANCES

TECHNICAL FIELD

This invention relates to management of a storage system.

BACKGROUND ART

A storage system is configured of one or more storage apparatuses and, as storage apparatuses, apparatuses to which has the Thin Provisioning technology are well known (e.g. Patent Literature 1). According to the Thin Provisioning (also called Dynamic Provisioning), virtual volumes (hereinafter referred to as VVOLs) which are virtual logical volumes are provided to the host computer. A VVOL is a set of multiple virtual areas (virtual storage areas). If a write occurs from the host computer to the VVOL, an actual area (an actual storage area, hereinafter referred to as a "page") is assigned from a pool to the write destination virtual area. The pool is configured of multiple pages.

CITATION LIST

Patent Literature

PTL 1: Japanese Unexamined Patent Application Publication No. 2003-015915

SUMMARY OF INVENTION

Technical Problem

A pool is, for example, configured of multiple logical volumes. Each logical volume is divided into multiple pages, and therefore, the pool is configured of page groups. A logical volume may be based on one or more physical storage devices which the storage apparatus comprises (e.g. RAID (Redundant Array of Independent (or Inexpensive) Disks) groups), or may also be based on a logical volume which another storage apparatus comprises.

The performance of a logical volume (e.g. response time) depends on the performance of one or more physical storage devices as the base of the logical volume. The performance of the one or more physical storage devices, for example, depends on the type of the physical storage devices, the RAID level of the RAID groups, or others.

Therefore, if the performance of one or more physical storage devices as the base of a logical volume and the performance of one or more physical storage devices as the base of another logical volume are different, the performances of the logical volumes are also different. For example, as the performance of an SSD (Solid State Drive) is higher than the performance of an HDD (Hard Disk Drive), the performance of a logical volume based on SSDs is higher than the performance of a logical volume based on HDDs.

Configuring a pool of multiple page groups of different performances (e.g. one or more logical volumes) can be considered. Then, creating multiple pools of that type can be considered. To each VVOL, any pool of the multiple pools is made to correspond. If a write to a virtual area of a VVOL occurs, to the write destination virtual area, pages are assigned from the pool made to correspond to the VVOL. A VVOL might be accessed only from one access source (e.g. a host or an application) and another VVOL might be accessed from multiple access sources. For example, there might be cases in which a first part of a VVOL is considered to be a virtual area group which can be accessed from a first access source and a second part of the VVOL (a different part from the first part) is considered to be the virtual area group which can be accessed from a second access source.

In this type of case, for achieving a performance required about access from an access source outside the storage system (performance requirement), it seems necessary to consider pages in which page group should be assigned to the VVOL what degree. For example, if high-performance pages in a large number considering a performance requirement are assigned to the VVOL, the performance requirement is satisfied excessively. This consumes high-performance pages uselessly; hence there is a possibility that the number of high-performance pages becomes insufficient. This indicates over-provisioning (waste) is occurring.

Therefore, the purpose of this invention is, while satisfying the performance requirement about access from the access source, inhibiting over-provisioning.

Solution to Problem

A storage system comprises multiple virtual volumes (hereinafter referred to as VVOLs), multiple pools, and a controller. Each VVOL is a virtual logical volume configured of multiple virtual areas. Each pool is a storage area configured of multiple actual area groups of different performances. The controller receives access commands from an access source, accesses actual areas assigned to virtual areas identified by the access commands. The controller manages pool condition information which is the information showing which actual areas are assigned to which virtual areas and the access load related to the virtual areas. The management system of the storage system comprises management information showing a performance requirement and a performance of each VVOL. The performance of each VVOL is identified with reference to the pool condition information. The management system, with reference to the management information, identifies a VVOL whose condition is inappropriate and, for changing the condition of the identified VVOL from inappropriate to appropriate, performs migration related to the pool made to correspond to the identified VVOL.

As access sources, various types of targets such as a host device, a virtual machine, and an application program, can be considered. Meanwhile, the performance of a VVOL or the performance of an actual area group is, for example, the performance related to access. For example, the performance related to access is a response time which is the length of time since a command for data access is input until a response to the command is output, or a data amount which is input/output per unit of time. Meanwhile, the access load is the load related to access, for example, an access frequency (the number of accesses performed per unit of time) or a data transfer rate (the amount of data transferred per unit of time). Furthermore, the "access load related to the virtual areas" may be the access load on the virtual areas or may also be the access load on the actual areas assigned to the virtual areas. Furthermore, access is, for example, write and/or read.

The management system may be one or more computers existing outside the storage system, or may also be integrated with the controller, or may also be integrated with the host device, or may also be realized as a combination of the storage system and the apparatus(es) existing outside the storage system.

The storage system may be configured of one storage apparatus or may also be configured of multiple storage apparatuses.

BRIEF DESCRIPTION OF DRAWINGS

FIG. 5 shows a page status management table 402.

FIG. 6 shows a pool management table 403.

FIG. 7 shows a VOL management table 404.

FIG. 8 shows a media status management table 405.

FIG. 10 shows a VVOL management table 5040.

FIG. 11 shows a tier definition table 5050.

FIG. 18 shows programs and information stored in a memory 2500 in the management computer 2000 related to the Embodiment 2.

FIG. 20 shows an example of an additional installation pattern maintenance table 2650.

FIG. 21 shows a VVOL management table 2004 related to the Embodiment 2.

FIG. 23 shows access distribution of the VVOLs 1 to 4.

FIG. 25 shows a VVOL management table 2701 related to the Embodiment 4.

DESCRIPTION OF EMBODIMENTS

Some of the embodiments of this invention are described below. Note that the technical scope of this invention must not be limited to the respective embodiments.

Note that, though the description below describes various types of information using the term of "xxx table," the various types of information may also be expressed by other data structures than tables. For showing the independence of the data structure, "xxx table" can be referred to as "xxx information."

Furthermore, the processing might be described below with a "program" as a subject, as the program performs the specified processing by being performed by a processor (e.g. a CPU (Central Processing Unit)) while appropriately using a storage resource (e.g. memory) and a communication control device (e.g. a communication port), the description with the processor as a subject may also be permitted. Furthermore, for example, the processing described with the program as a subject may also be treated as the processing performed by the management system. Furthermore, part of or the entire program may also be permitted to be realized by dedicated hardware. Therefore, the processing described with the program as a subject may also be treated as the processing performed by a controller. The controller may include a processor and a storage resource storing a computer program performed by the processor, or may also include the above-mentioned dedicated hardware. Furthermore, the computer program may also be installed by a program source to the respective computers. The program source, for example, may also be a program distribution server or a recording medium.

Note that the management system may be configured of one or more computers. As more specifically described, for example, if the management computer displays information or if the management computer transmits information for display to a remote computer, the management computer is the management system. Meanwhile, if the functions equivalent to the management computer are realized by multiple computers, the relevant multiple computers (a computer for display may be included if the computer for display performs display) are the management system.

Embodiment 1

Figure 1:
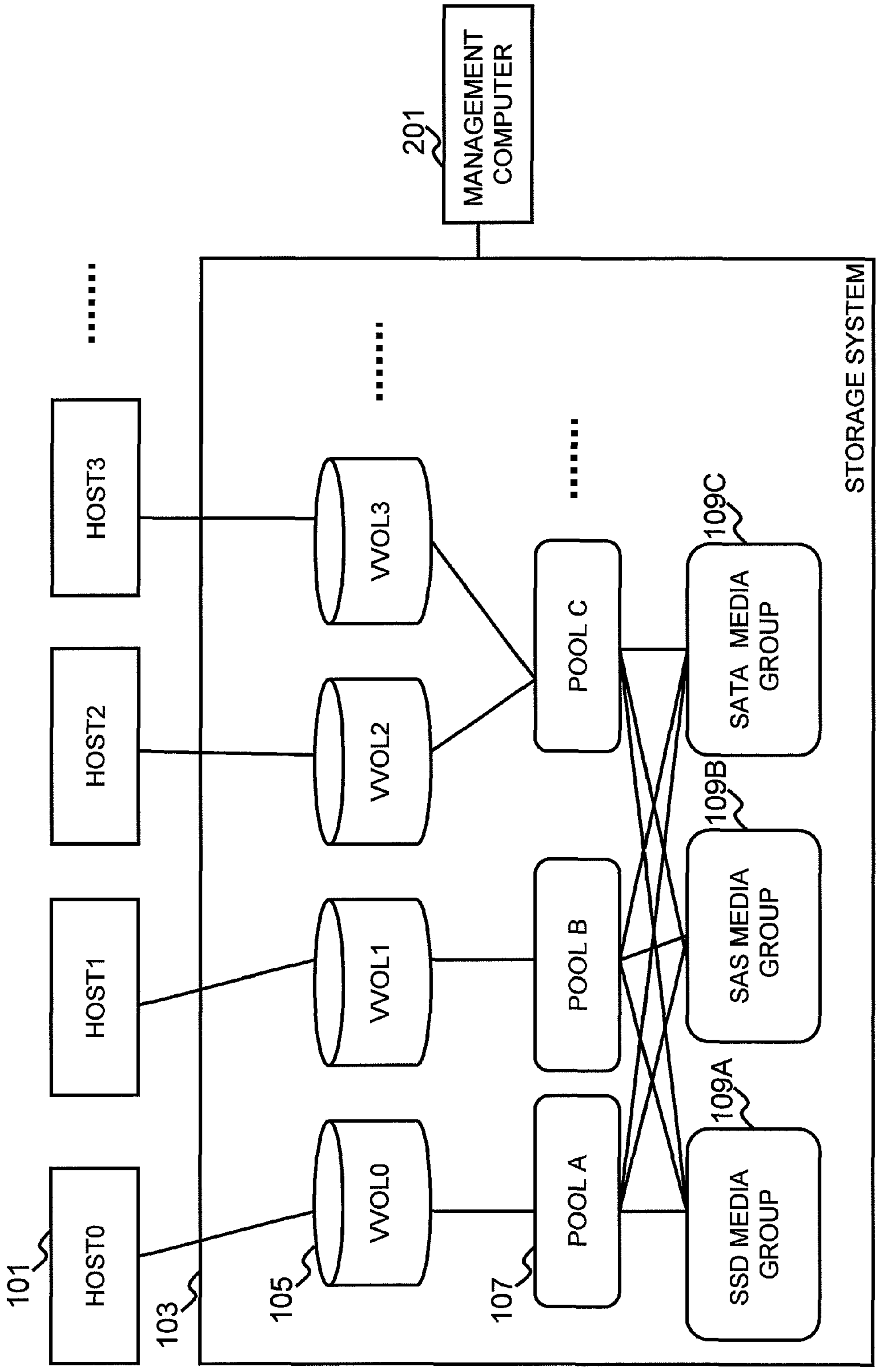
FIG. 1 shows a computer system related to the Embodiment 1 of this invention.

FIG. 1 shows a computer system related to the Embodiment 1 of this invention.

To a storage system 103, a host device 101 and a management computer 201 are connected.

The storage system 103 is configured of one or more storage apparatuses. At least one of the one or more storage apparatuses is an apparatus to which the Thin Provisioning technology is applied.

The storage system 103 comprises multiple media groups of different performances. A media group is a set of one or more media. "Media" referred to in this embodiment indicate logical volumes.

As multiple media groups, this embodiment refers to three media groups, as more specifically described, an SSD media group 109A, an SAS (Serial Attached SCSI) media group 109B, and an SATA (Serial ATA (Advanced Technology Attachment)) media group 109C. The SSD media group 109A is configured of SSD media (logical volumes based on SSD), the SAS media group 109B is configured of SAS media (logical volumes based on SAS-HDDs (Hard Disk Drives)), and the SATA media group 109C is configured of SATA media (logical volumes based on SATA-HDDs). At least one of these three media groups may be different types of media groups, and the number of media groups only has to be 2 or more. For example, the SAS media group 109B may be separated into a media group based on SAS 10 Krpm (SAS whose number of rotations is 10,000 revolutions per minute) and a media group based on SAS 15 Krpm (SAS whose number of rotations is 15,000 revolutions per minute). Meanwhile, there may also be a media group provided from a different storage apparatus from the storage apparatus comprising pools 107 (external media group).

The storage system 103 comprises multiple pools 107. Each pool 107 is configured of multiple media of different performances. As more specifically described, for example, each pool 107 is configured of one or more SSD media of the SSD media group 109A, one or more SAS media of the SAS media group 109B, and one or more SATA media of the SATA media group 109C. Each media is divided into multiple pages. Therefore, each pool 107 is supposed to be configured of an SSD page group, an SAS page group, and a SATA page group.

Note that, as described later, one pool 107 comprises multiple tiers. One tier is configured of one or more media of the same performance. Therefore, for example, a tier configured of SSD media exists as a higher tier, a tier configured of SAS media exists as a medium tier, and a tier configured of SATA media exists as a lower tier. For each tier, an access frequency range (a range of an access frequency) is set. The access frequency is the number of accesses per unit of time and expressed, for example, by the IOPS. Note that the IOPS is the IO per second, that is, the number of accesses (I/O (Input/Output)) performed per second.

The storage system 103 comprises multiple VVOLs 105. One VVOL 105 is provided to one host device 101 of multiple host devices 101. In this embodiment, the relation between a VVOL 105 and a host device 101 is one-to-one. The VVOL 105 is a virtual logical volume and is configured of multiple virtual areas (virtual storage areas). The virtual area is, for example, an address (e.g. an LBA (Logical Block Address)).

The host device 101 is an example of an access source. The host device 101 accesses the provided VVOL 105. As more specifically described, the host device 101 transmits an access command including access destination information to the storage system 103. The access destination information is the information showing an access destination which, for example, includes the ID of the VVOL 105 (e.g. an LUN (Logical Unit Number)) and the ID of the virtual area (e.g. an LBA).

Figure 2:
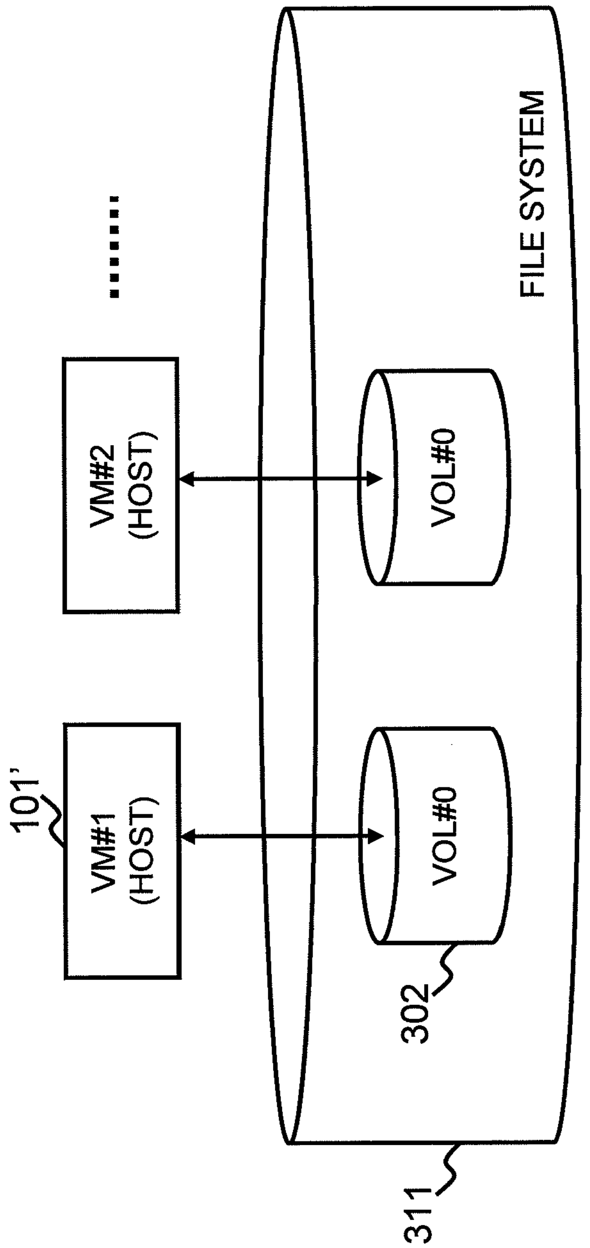
FIG. 2 shows a relationship, in a case the access source in the computer system is a virtual machine, between volumes recognized by the virtual machine and a file system recognized by a hypervisor which manages the virtual machine.

In this embodiment, the host device 101 is a computer. However, the host device 101 may also be a device of another type, for example, a storage apparatus outside the storage system (e.g. a storage apparatus as the copy source of remote copy) or may also be a virtual machine. For example, multiple virtual machines may be operated on a physical host computer (typically, a server machine), and those multiple virtual machines may be managed by a hypervisor performed by the host computer (not shown in the figure). In this case, for example, as shown in FIG. 2, each virtual machine (VM) 101' recognizes a logical device (VOL) 302 made to correspond to the provided VVOL (that is, the virtual machine 101' recognizes the VVOL). However, the hypervisor recognizes the multiple logical devices 302 recognized by multiple virtual machines 101' as multiple files, and those multiple logical devices 302 are supposed to be managed by a file system 311. In this embodiment, an SLO (Service Level Objective) which is an example of a performance requirement is set for each VVOL, but an SLO may be set for each file system 311.

The management computer 201 is a computer managing the storage system 103. The management computer 201 collects various types of information from the storage system 103 and, with reference to the collected information, controls data assignment in multiple pools 107. The functions which the management computer 201 comprises may also be installed in the storage system or may also be installed in a host device 101. In this case, the management computer 201 does not have to exist.

Figure 3:
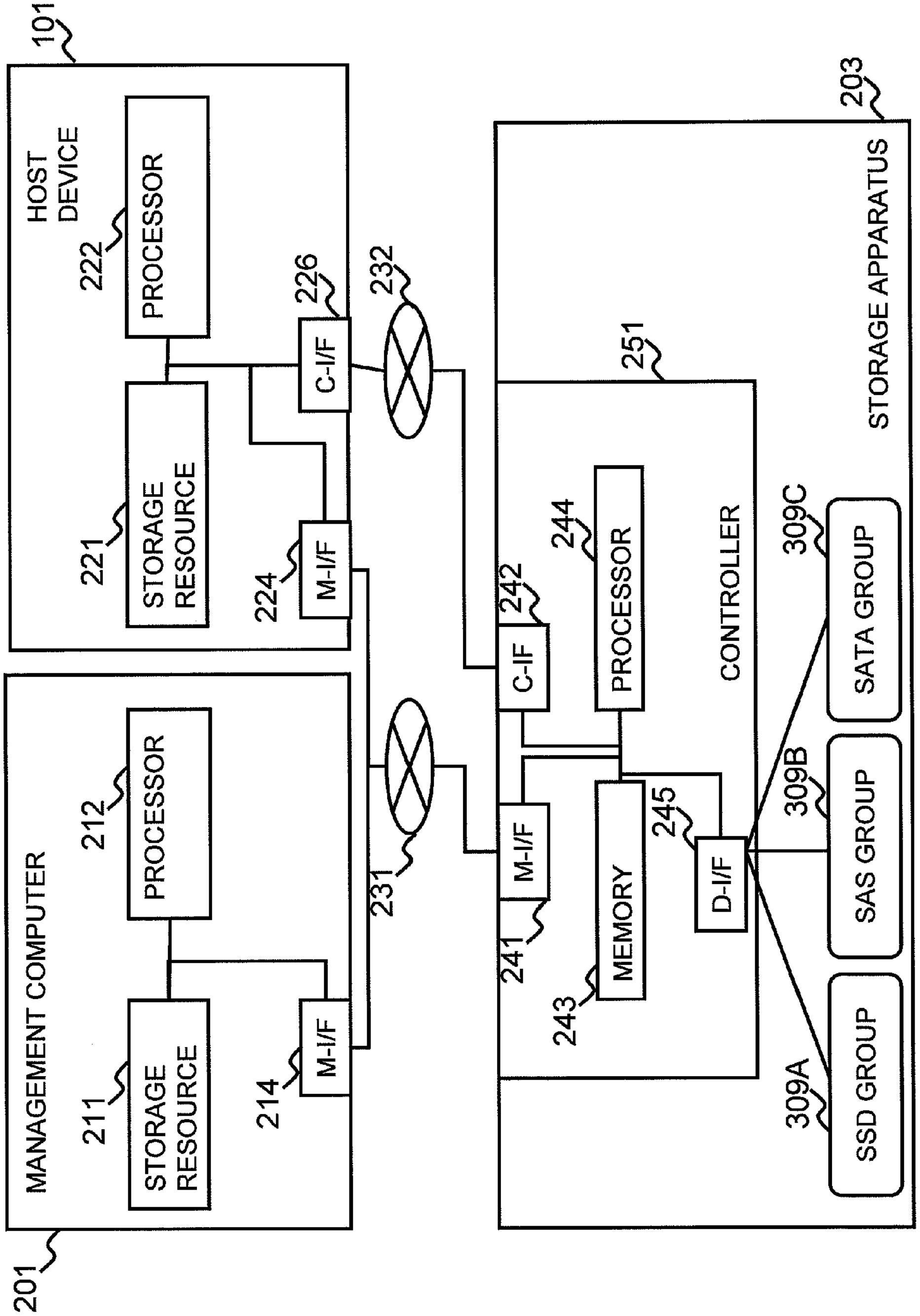
FIG. 3 shows the configuration of a host device 101, a management computer 201, and a storage apparatus 203.

FIG. 3 shows the configuration of one host device 101 of the multiple host devices 101, the configuration of the management computer 201, and the configuration of one storage apparatus 203 of the one or more storage apparatuses configuring the storage system 103.

To the storage apparatus 203, via a first communication network (e.g. LAN (Local Area Network)) 231, the management computer 201 and the host device 101 are connected. Meanwhile, to the storage apparatus 203, via a second communication network (e.g. SAN (Storage Area Network)) 232, the host device 101 is connected. The first and the second communication networks 231 and 232 may also be integrated.

The storage apparatus 203 comprises physical storage device groups and a controller 251 connected to the physical storage device groups.

The physical storage device group is one or more physical storage devices. As physical storage device groups, this embodiment refers to an SSD group 309A, an SAS group 309B, and a SATA group 309C. The SSD group 309A is one or more SSDs, the SAS group 309B is one or more SAS-HDDs, and the SATA group 309C is one or more SATA-HDDs. As described above, in physical storage device groups, multiple physical storage devices of different performances are mixed.

The controller 251 comprises a management I/F (described as an M-I/F in the FIG. 241, a communication I/F (described as a C-I/F in the FIG. 242, a device I/F (D-I/F in the FIG. 245, a memory 243, and a processor 244 connected to those components.

The management I/F 241 is a communication interface device for the communication by a first protocol (e.g. an NIC (Network Interface Card)).

The communication I/F 242 is a communication interface device for the communication by a second protocol.

The device I/F 245 is a communication interface device for the communication with the physical storage devices by a third protocol. A device I/F 245 may also exist for each type of the physical storage devices. Via the device I/F 245, access to the physical storage devices is performed.

The memory 243 stores computer programs executed by the processor 244 and various types of information. Furthermore, the memory 243 comprises a cache memory area. In the cache memory area, data complying with write commands received from the host device 101 and data read from pages (as more specifically described, physical storage devices as the base of the pages) in response to read commands received from the host device 101 is temporarily stored. The write target data in the cache memory area is stored in the physical storage devices as the base of the pages assigned to the write destination virtual area. The read target data in the cache memory area is provided to the host device 101.

The host device 101 comprises a management I/F (e.g. an NIC) 224, a communication I/F (e.g. an HBA (Host Bus Adapter)) 226, a storage resource 221, and a processor 222 connected to the above. The storage resource 221 is, for example, a memory (an auxiliary storage unit such as a hard disk drive may also be included). The storage resource 221, for example, stores application programs (e.g. an operation program) or OS (Operating System), and the processor 222 executes the application programs and the OS.

The management computer 201 comprises a management I/F (e.g. an NIC) 214, a storage resource 211, and a processor 212 connected to the above. The storage resource 211 is, for example, a memory (an auxiliary storage unit such as a hard disk drive may also be included). The storage resource 211 stores computer programs and various types of information. The computer programs are executed by the processor 212.

An example of the hardware configuration of the computer system related to this embodiment is as described above. What type of communication interface device the above-mentioned management I/F or the communication I/F is depends, for example, on the type of the network to which the I/F is connected or the type of device which comprises the I/F.

Figure 4:
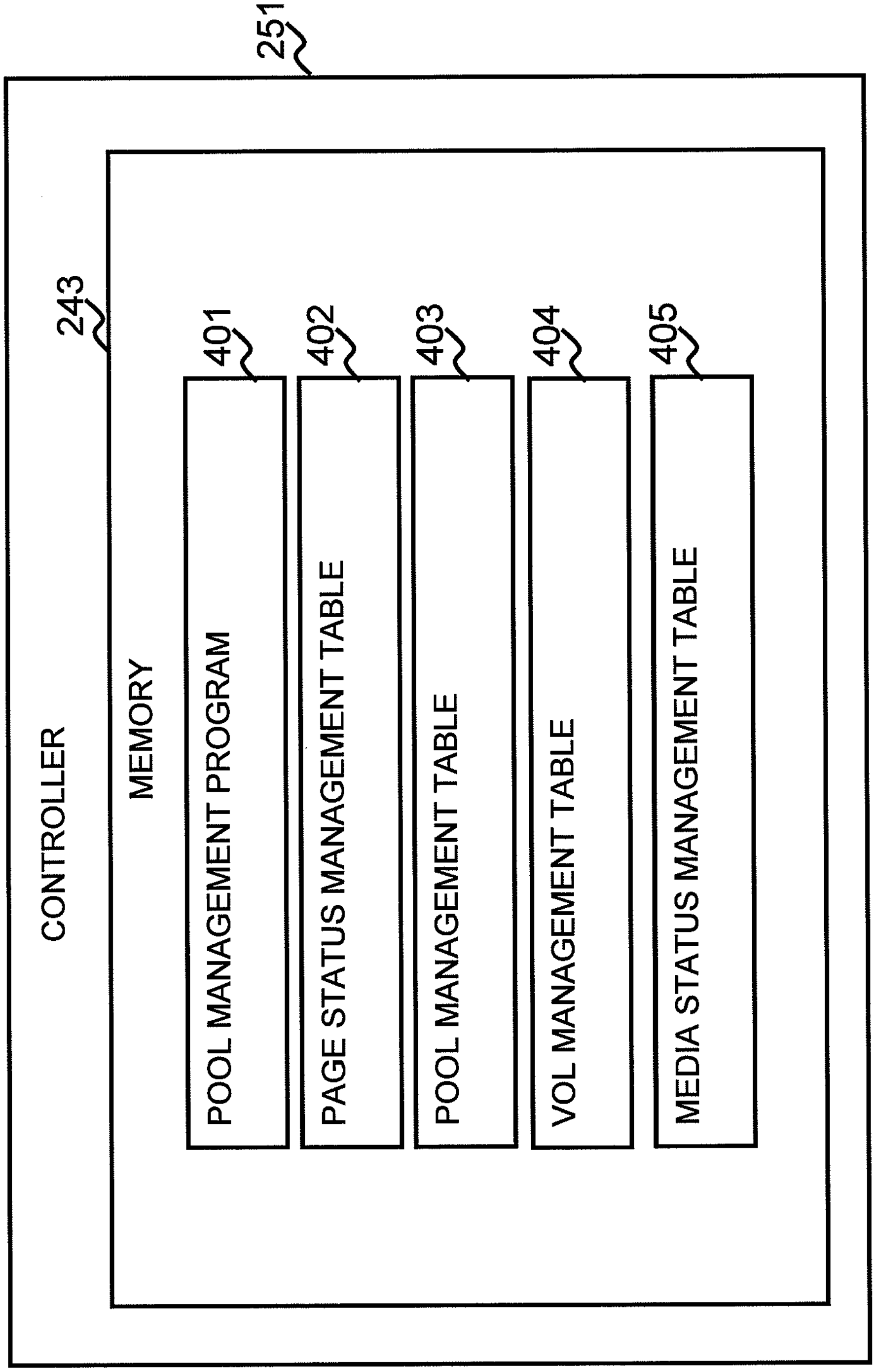
FIG. 4 shows programs and information stored in a memory 243 of a controller 251.

FIG. 4 shows programs and information stored in the memory 243 of the controller 251.

As a program, a pool management program 401 is stored. As information, a page status management table 402, a pool management table 403, a VOL management table 404, and a media status management table 405 are stored.

FIG. 5 shows the page status management table 402.

The page status management table 402 shows the status of each page. As more specifically described, for example, the table 402, for each page, comprises information described below.

Pool ID 501: the ID of the pool comprising the page,

Page ID 502: the ID of the page,

VVOL ID 503: the ID of the VVOL comprising the virtual area as the page assignment destination and, in case of "N/A," indicating that the page is not assigned to any virtual area (Not Assigned), Last access time 504: information showing the time at which the page is last accessed, and Access frequency 505: the frequency of access to the page.

The last access time 504 may also be divided into the time of the last write to the page and the time of the last read from the page.

The access frequency 505 may also be divided into the write frequency and the read frequency. The access frequency 505 is updated if the page is accessed and not updated if an access command is received but the page is not accessed.

FIG. 6 shows the pool management table 403.

The pool management table 403 shows the correspondence relationship between respective pages and virtual areas configuring the pool. As more specifically described, for example, the table 403, for each page, comprises information described below.

Pool ID 601: the ID of the pool comprising the page,

Page ID 602: the ID of the page,

Media ID 603: the ID of the media comprising the page,

Media LBA 604: the location of the page in the media (the head LBA of the page and the last LBA of the page)

VVOL ID 605: the ID of the page assignment destination VVOL which, in case of "N/A," indicates that the page is not assigned to any virtual area (Not Assigned), and VVOL LBA 606: the location of the page assignment destination virtual area in the VVOL (the head LBA of the virtual area and the last LBA of the virtual area).

FIG. 7 shows VOL management table 404.

The VOL management table 404 comprises the information related to the volumes which the storage apparatus comprises. As more specifically described, for example, the table 404, for each volume, comprises information described below.

VOL ID 701: the ID of the VVOL or the ID of the medium,

Capacity 702: the storage capacity of the VVOL or the storage capacity of the medium, Type 703: [the information showing] whether the volume is a VVOL or a medium and, if the volume is a medium, showing the type of the medium (SSD, SAS, or SATA), and Pool ID 704: the information for which a valid value is set if the volume is a VVOL, which is the ID of the pool made to correspond to the VVOL.

FIG. 8 shows the media status management table 405.

The media status management table 405 comprises the information related to the media status. As more specifically described, for example, the table 405, for each medium, comprises information described below.

Pool ID 801: the ID of the pool comprising the medium,

Media ID 802: the ID of the medium,

Tier type 803: the information showing the type of the tier to which the medium belongs, Access frequency limit 804: the upper limit value of the access frequency of the medium, and Access frequency 805: the access frequency of the medium.

The tables from 402 to 405 are as described above. Note that, in addition to those tables, a mapping management table showing which page is assigned to each virtual area (not shown in the figure) may also be prepared. Whether pages are assigned to the virtual area or not may also be determined with reference to the mapping management table.

FIG. 4 is referred to again.

The pool management program 401, with reference to the above-mentioned tables from 402 to 405, for example, performs the procedures below.

(A) The program 401 performs the write procedure including the processing from (a1) to (a9) below.

(a1) The program 401 receives a write command from the host device 101.

(a2) The program 401, with reference to the access destination information which the write command comprises, identifies the write destination VVOL and the write destination virtual area.

(a3) The program 401 stores the write target data complying with the write command in the cache memory area. The program 401, at this step, may respond write completion to the host device 101.

(a4) The program 401, with reference to the page status management table 402 (or the above-mentioned mapping management table), determines whether pages are assigned to the write destination virtual area identified at the above-mentioned (a2) or not.

(a5) If the result of the determination at the above-mentioned (a4) is positive, the program 401 writes the write target data in the cache memory area to the pages assigned to the write destination virtual area.

(a6) If the result of the determination at the above-mentioned (a4) is negative, the program 401, with reference to the VOL management table 404 and the page status management table 402 or the pool management table 403, identifies unused pages (pages not assigned to any virtual area) in the pool made to correspond to the write destination VVOL. At this point, the program 401, with reference to the media status management table 405, may identify unused pages from the medium belonging to the tier as high as possible.

(a7) The program 401 makes the page identified at the above-mentioned (a6) correspond to the write destination virtual area. As more specifically described, for example, the program 401, to the pool management table 403, as the VVOL LBA 606 corresponding to the assigned pages, writes the head LBA and the last LBA of the write destination virtual area.

(a8) The program 401, to the page identified at the above-mentioned (a6), writes the write target data in the cache memory area (the program 401, at this step, may respond write completion to the host device 101).

(a9) The program 401, at the above-mentioned (a5) or (a8), updates the last access time 504 and the access frequency 505 of the data write destination page in the page status management table 402. Furthermore, along with that, the program 401 updates the access frequency 805 of the medium comprising the pages in the media status management table 405.

(B) The program 401 performs the read procedure including the processing from (b1) to (b8) below.

(b1) The program 401 receives a read command from the host device 101.

(b2) The program 401, with reference to the access destination information which the read command comprises, identifies the read source VVOL and the read source virtual area. (b3) The program 401 determines whether read target data remains in the cache memory area or not.

(b4) If the result of the determination at the above-mentioned (b3) is positive, the program 401 transmits the read target data in the cache memory area to the host device 101. In this case, the last access time 504 and the access frequency 505 of the pages assigned to the read source virtual area (and the access frequency 805 of the medium which has these pages) are not updated.

(b5) If the result of the determination at the above-mentioned (b3) is negative, the program 401, with reference to the page status management table 402 (or the above-mentioned mapping management table), determines whether pages are assigned to the read source virtual area identified at the above-mentioned (b2) or not.

(b6) If the result of the determination at the above-mentioned (b5) is negative, the program 401 transmits specified data (e.g. an error) to the host device 101.

(b7) If the result of the determination at the above-mentioned (b5) is positive, the program 401 reads data from the pages assigned to the read source virtual area, and writes the data to the cache memory area. Then, the program 401 transmits the data in the cache memory area to the host device 101.

(b8) The program 401, at the above-mentioned (b6), updates the last access time 504 and the access frequency 505 of the data write destination page in the page status management table 402. Furthermore, along with that, the program 401 updates the access frequency 805 of the medium which has the pages in the media status management table 405.

(C) The program 401 performs the additional media installation processing including the processing from (c1) to (c3) below. Note that, after (c3), the (E) rebalance procedure described later may be performed.

(c1) The program 401 gives an ID to the medium as the additional installation target.

(c2) The program 401 partitions the medium as the additional installation target into pages, and gives an ID to each of the pages acquired through the partition.

(c3) The program 401 adds the information related to the medium as the additional installation target (the ID of the pool as the additional installation destination of the medium, the media ID given at (c1), the page IDs given at (c2), and others) to the tables from 402 to 405.

(D) The program 401 performs the media deletion procedure including the processing (d1) and (d2) below.

(d1) The program 401 performs the rebalance procedure in which the data in all the used pages (the pages assigned to any of the virtual areas) in the deletion target medium is migrated to another medium.

(d2) The program 401 deletes the information related to the deletion target medium from the tables from 402 to 405.

(E) The program 401 can perform the rebalance procedure including the processing from (e1) to (e4) below. In that case, for example, the memory 243 may comprise the tier definition table described later which the management computer 201 comprises. This rebalance procedure may be performed periodically. Furthermore, this rebalance procedure may be applied to the rebalance procedure at the above-mentioned (d1).

(e1) The program 401 decides a migration source page. The migration source page is the page in which inappropriately located data is stored. As more specifically described, the migration source page is the page whose access frequency 505 is not within the access frequency range of the tier which comprises the page. Note that the migration source page is, in the rebalance procedure at the above-mentioned (d1), the used page in the deletion target medium.

(e2) The program 401 identifies the tier corresponding to the access frequency range to which the access frequency 505 of the migration source page obtained at the above-mentioned (e1) belongs.

(e3) The program 401, from the tier identified at the above-mentioned (e2), identifies an unused page. The unused page identified at this point is the migration destination page.

(e4) The program 401 migrates the data in the migration source page identified at the above-mentioned (e1) to the migration destination page identified at the above-mentioned (e3). Furthermore, the program 401 assigns the migration destination page to the virtual area to which the migration source page is assigned instead of the migration source page (the tables 402 and 403 are updated).

Note that the rebalance procedure of (E) may also be performed, instead of or in addition to the comparison of the access frequencies and the access frequency ranges, with reference to the elapsed time since the last access time 504 of each page.

Figure 9:
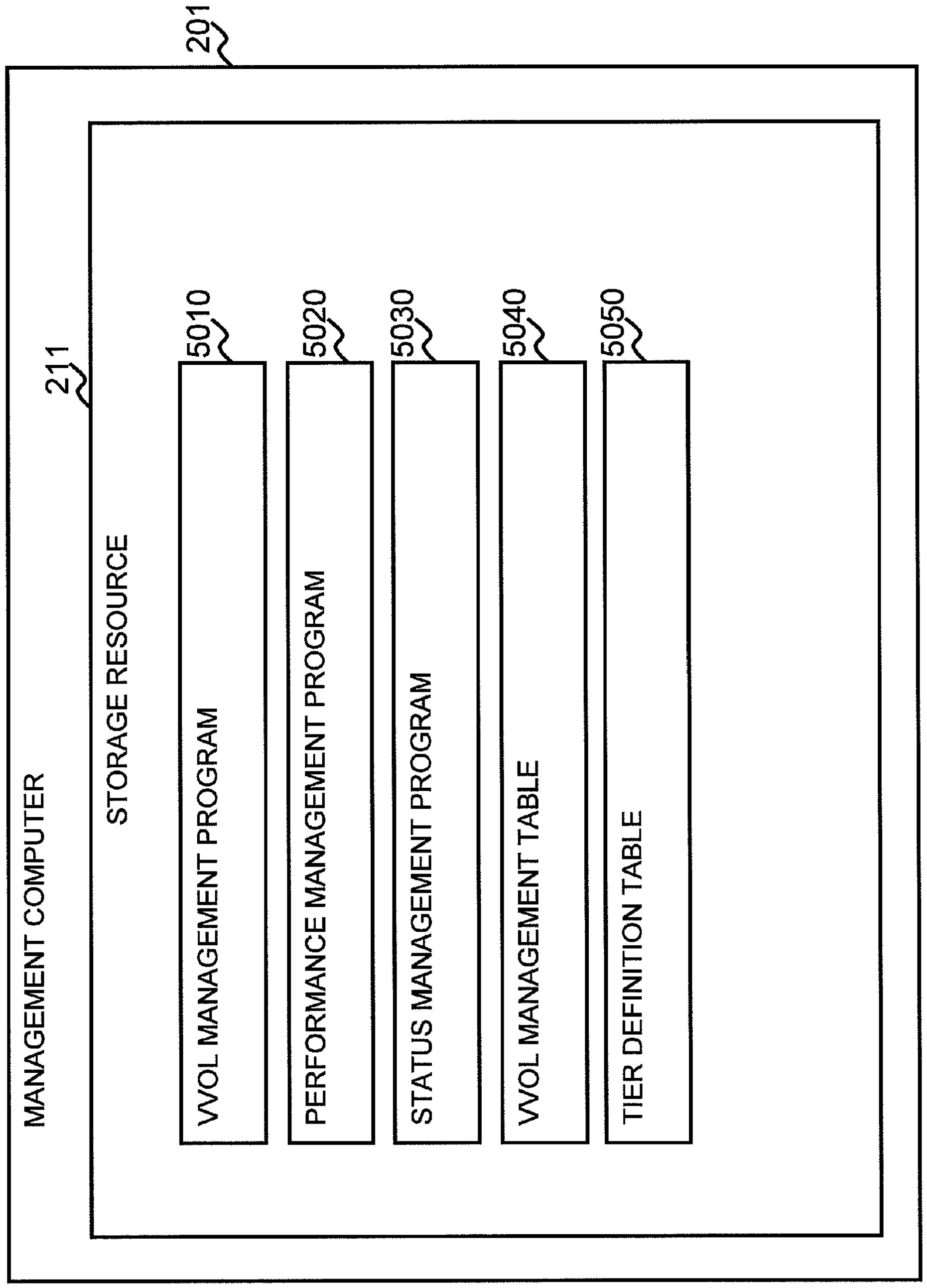
FIG. 9 shows programs and information stored in a storage resource 211 in the management computer 201.

FIG. 9 shows programs and information stored in the storage resource 211 in the management computer 201.

As programs, a VVOL management program 5010, a performance management program 5020, and a status management program 5030 are stored. As information, a VVOL management table 5040 and a tier definition table 5050 are stored.

FIG. 10 shows the VVOL management table 5040.

The VVOL management table 5040 comprises the information related to VVOLs. As more specifically described, for example, the table 5040, for each VVOL, comprises information below.

VVOL ID 1001: the ID of the VVOL,

Subsystem ID 1002: the ID of the storage apparatus comprising the VVOL,

Pool ID 1003: the ID of the pool which is associated with the VVOL,

SLO 1004: the information showing the SLO of the VVOL,

Capacity 1005: the information showing the capacity of the VVOL,

Used capacity 1006: the information showing the total storage capacity of the virtual areas to which pages are assigned among the virtual areas configuring the VVOL, and Performance 1007: the information showing the performance of the VVOL.

The SLO is the threshold compared with the performance 1007 or the value as the base of the threshold. The performance 1007 is the average response time of the VVOL. The "response time" referred to herein is, for example, the length of time since an access command specifying a VVOL reaches the storage system until the response is returned to the host device 101.

The average response time of a VVOL can be obtained by the expression (1) described below.

(VVOL's average response time)=(sum of products of access frequency and response time for all pages assigned to VVOL)/(sum of access frequency of all pages assigned to VVOL): (1).

At this point, the unit of access frequency is, for example, IOPS (IO per second).

For example, pages from 1 to 6 are assumed to be assigned to a VVOL. For each page from 1 to 6, "Tier to which the page belongs/access speed at the tier/access frequency of the page" is assumed to be as described below.

Page 1: higher tier (SSD)/1/100,
Page 2: medium tier (SAS)/10/50,
Page 3: medium tier (SAS)/10/20,
Page 4: lower tier (SATA)/20/10
Page 5: lower tier (SATA)/20/5,
Page 6: lower tier (SATA)/20/0.

In this case, according to the expression (1), the VVOL average response time K amounts as described below.

$$K=(100\times1+50\times10+20\times10+10\times20+5\times20+0\times20)/(100+50+20+10+15)=\text{approximately } 5.37$$

The access speed can be obtained from the tier definition table 5050 described later.

The average response time (performance) obtained as described above is compared with the SLO (or a specified percentage of the SLO (e.g. 80%)).

Note that the description below uses the expressions "the SLO 1004 is large/small" and "the performance 1007 is large/small," which indicate that the value of the SLO is large/small and that the value of the performance is large/small. If the performance 1007 (and the SLO 1004) is, for example, the average response time, [the description] that the performance 1007 (and the SLO 1004) is large indicates that the performance (and the SLO) is low, and [the description] that the performance 1007 (and the SLO 1004) is small indicates that the performance (and the SLO) is high.

FIG. 11 shows the tier definition table 5050.

The tier definition table 5050 shows the definition of tiers. As more specifically described, for example, the table 5050, for each tier, comprises the information described below.

Tier type 1101: the information showing the type of the tier,
Media type 1102: the information showing the type of the media belonging to the tier,
Speed 1103: the information showing the access speed of the tier,
Maximum access frequency 1104: the maximum value of the access frequency corresponding to the tier, and
Cost 1105: the information showing the cost of the media belonging to the tier.

By the maximum access frequency 1104 of each tier, the access frequency range of each tier is indicated. As more specifically described, according to FIG. 11, the access frequency range of the higher tier (SSD) is 25000 to 2500 (not including 2500), the access frequency range of the medium tier (SAS) is 2500 to 1250 (not including 1250), and the access frequency range of the lower tier (SATA) is 1250 to 0.

Hereinafter, the procedure performed in the Embodiment 1 is described.

In the Embodiment 1, an inappropriate VVOL is detected. In that case, the processing from (1) to (3) below are performed.

(1) A medium is migrated from another pool to the pool which has the inappropriate VVOL. The pool of the migration source and the pool of the migration destination are in the same storage apparatus.
(2) The data in all the pages assigned to the inappropriate VVOL is migrated from the pool comprising the page to another pool.
(3) At the above-mentioned (1) and (2), if the inappropriate VVOL does not become an appropriate VVOL, a medium is added to the pool made to correspond to the inappropriate VVOL.

Furthermore, in the Embodiment 1, an inappropriate medium is detected. In that case, data reallocation in the tier comprising the medium is performed, or a medium is added to the tier comprising the medium.

Hereinafter, the procedures performed in the Embodiment 1 are described in details.

Virtual Volume Management

The VVOL management program 5010 manages VVOLs. For example, the program 5010 receives an instruction for creating a VVOL from the administrator. In that case, the program 5010 receives the VVOL capacity, the SLO, and others. The program 5010, in response to the instruction for creating a VVOL, determines a pool to make correspond to the VVOL and a storage apparatus comprising the pool. Then, the program 5010 adds information complying with the determination and an entry (record) including the VVOL capacity and the SLO to the VVOL management table 5040.

Status Management

Figure 12:
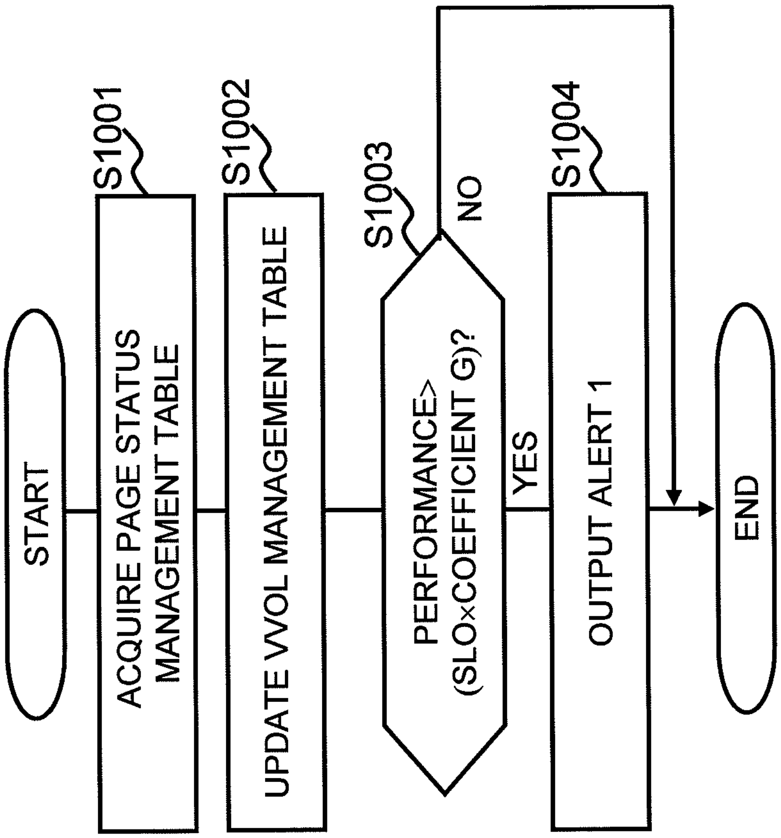
FIG. 12 shows the flow of a first status management procedure.

FIG. 12 shows the flow of a first status management procedure. This procedure is performed, for example, periodically.

The status management program 5030 acquires the page status management table 402 from the storage apparatus (step S1001).

The program 5030, with reference to the acquired table 402, updates the VVOL management table 5040 (S1002). With a VVOL as an example, as more specifically described, the procedure described below is performed.

The program 5030 writes the total storage capacity of all the pages assigned to the VVOL to the field of the used capacity 1006 corresponding to the VVOL.

The program 5030, with reference to how many pages in what tier are assigned to the VVOL and the speed of each tier, obtains the performance of the VVOL. The program 5030 writes the information showing the obtained performance to the field of the performance 1007 corresponding to the VVOL.

The program 5030 determines whether an inappropriate VVOL exists or not (S1003). An inappropriate VVOL is a VVOL whose performance 1007 does not satisfy the SLO 1004. As more specifically described, for example, an inappropriate VVOL is a VVOL whose performance 1007 is larger than the product of the SLO 1004 and the coefficient g (e.g. a VVOL whose average response time is longer than the product of the SLO 1004 and the coefficient g). Note that the coefficient g is a number larger than 0 and equal to or smaller than 1. In case of g=1, the performance 1007 is compared with the SLO 1004 itself.

If the result of the determination at S1003 is positive, the program 5030 outputs an alert 1 (S1004). The alert 1, for example, comprises the ID of the VVOL determined to be inappropriate at S1003.

Figure 13:
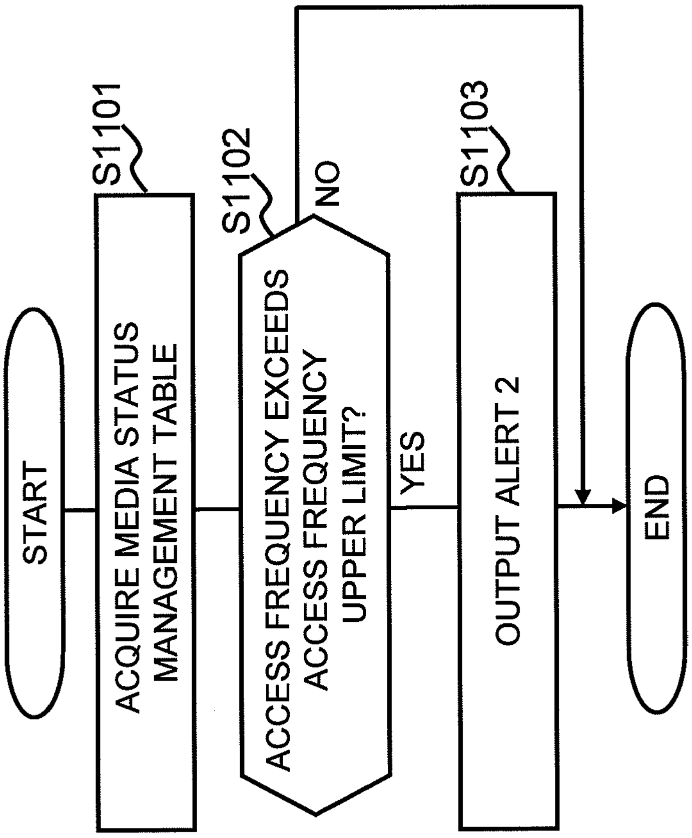
FIG. 13 shows the flow of a second status management procedure.

FIG. 13 shows the flow of a second status management procedure. This procedure is performed, for example, periodically.

The status management program 5030 acquires the media status management table 405 from the storage apparatus (step S1101).

The program 5030, with reference to the acquired table 405, determines whether an inappropriate medium exists or not (S1102). An inappropriate medium is a medium whose access frequency 805 exceeds the access frequency upper limit 804.

If the result of the determination at S1102 is positive, the program 5030 outputs an alert 2 (S1103). The alert 2, for example, comprises the ID of the medium determined to be inappropriate at S1102.

Performance Management

Figure 14:
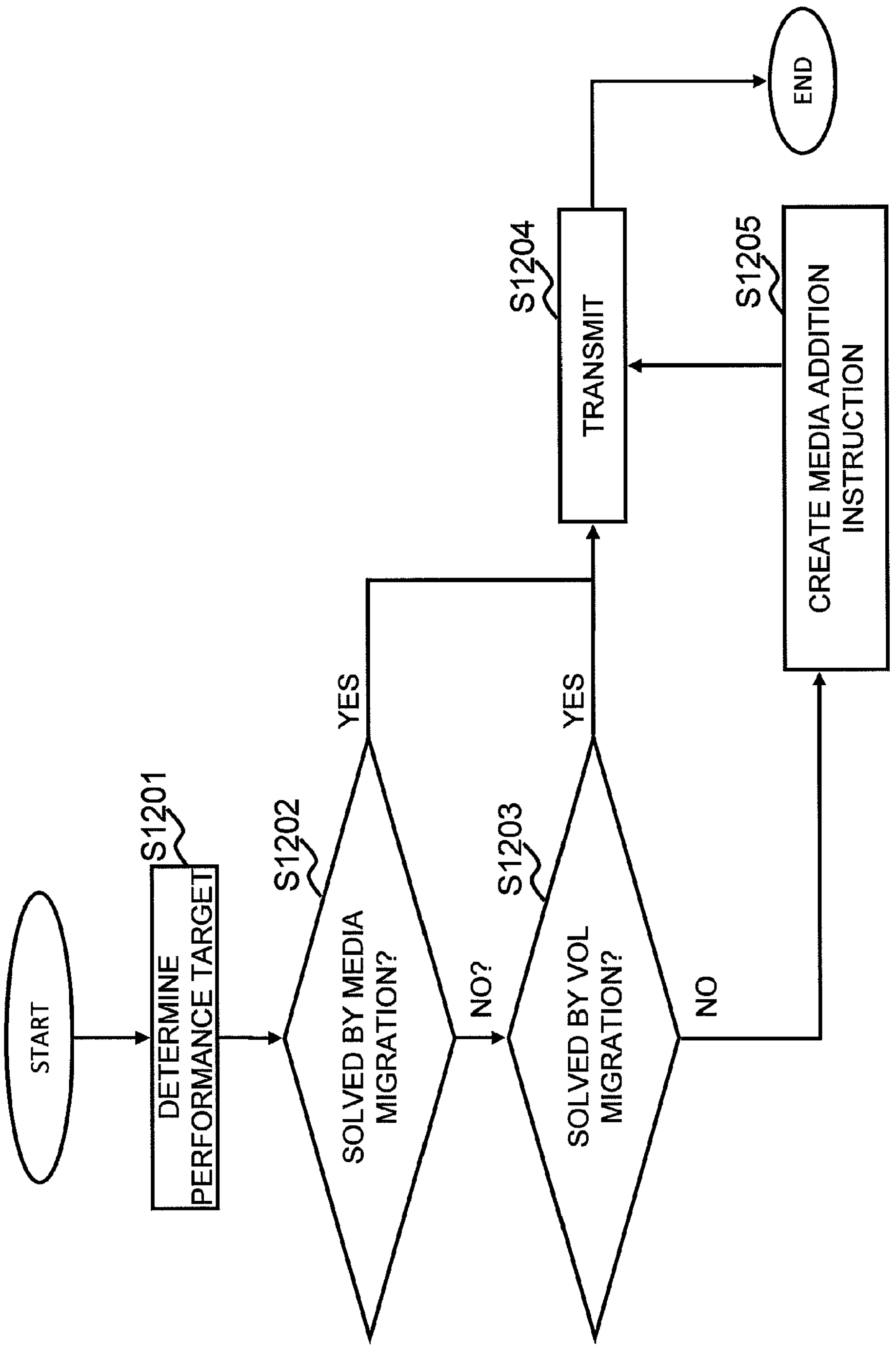
FIG. 14 shows the flow of a procedure performed by a performance management program 5020 which received an alert 1.

FIG. 14 shows the flow of the procedure performed by the performance management program 5020 which received the alert 1. Note that the description below refers to the inappropriate VVOL which is the cause of the alert 1 as the "alert-1-VVOL," the pool made to correspond to the alert 1-VVOL as the "alert-1-pool," and the storage apparatus comprising the alert-1-pool as the "alert-1-storage-apparatus."

The performance management program 5020 determines a performance target (S1201). The performance target is, for example, that the performance of an alert-1-VVOL is lower than the product of the SLO 1040 of the VVOL and the coefficient g. The alert-1-VVOL is, for example, identified by the ID of the VVOL which the alert 1 comprises.

The program 5020 determines whether the performance target determined at S1201 can be achieved by media migration or not (S1202). If the result of the determination at S1202 is positive, the instruction created at S1202 is transmitted to the alert-1-storage-apparatus (S1204).

If the result of the determination at S1202 is NO, the program 5020 determines whether the performance target determined at S1201 can be achieved by VVOL migration or not (S1203). If the result of the determination at S1203 is positive, the instruction created at S1203 is transmitted to the alert-1-storage-apparatus (S1204).

If the result of the determination at S1203 is negative, S1205 is performed. That is, the program 5020 determines an additional capacity (a storage capacity which should be added) for achieving the performance target determined at S1201, and creates an instruction for adding the determined additional capacity (hereinafter referred to as the media addition instruction). This media addition instruction is transmitted to the alert-1-storage-apparatus and, in the storage apparatus, the capacity complying with the media addition instruction is added to the pool. At S1205, as more specifically described, for example, the procedure described below is performed.

- The program 5020, with reference to the tier definition table 505, obtains how many pages must be added to what tier for achieving the performance target determined at S1201. At this point, W1, W2, and W3 are assumed to be obtained. W1 is the capacity for adding to the higher tier (SSD), that is, the total storage capacity of the number of pages obtained for the higher tier (SSD). W2 is the capacity for adding to the medium tier (SAS), that is, the total storage capacity of the number of the pages obtained for the medium tier (SAS). W3 is the capacity for adding to the lower tier (SATA), that is, the total storage capacity of the number of pages obtained for the lower tier (SATA).
- The program 5020 creates a media addition instruction. The media addition instruction comprises the above-mentioned W1, W2, and W3 and the ID of the alert-1-pool. At S1204, this media addition instruction is transmitted to the alert-1-storage-apparatus. In the storage apparatus, the pool management program 401 adds one or more SSD media whose total storage capacity is equal to or larger than W1, one or more SAS media whose total storage capacity is equal to or larger than W2, and one or more SATA media whose total storage capacity is equal to or larger than W3 to the pool identified by the media addition instruction. The media added to the pool at this point are, for example, unused media.

Media addition, instead of being performed automatically as described above, may also be performed manually by the administrator. For example, it may also be permitted that the program 5020 displays the obtained W1, W2, and W3, and that the administrator, with reference to the W1 to W3, adds the capacity to the pool.

The procedure performed in case of receiving an alert 1 is as above. Note that S1202 is performed ahead of S1203 because the cost of media migration is lower than the cost of VVOL migration. "Media migration" indicates migrating the media configuring a different pool from the alert-1-pool to the alert-1-pool to the alert-1-pool. Media migration, which may be performed between storage apparatuses, is performed in one storage apparatus in this embodiment. That is, the migration source pool of the media and the migration destination pool of the media (alert-1-pool) exist in one storage apparatus. "VVOL migration" indicates migrating the data in all the pages assigned to the VVOL from the alert-1-pool to another pool. In this case, the migration target VVOL is made to correspond to the migration destination pool instead of the alert-1-pool. VVOL migration may be performed in one storage apparatus, and may also be performed between storage apparatuses.

Figure 15:
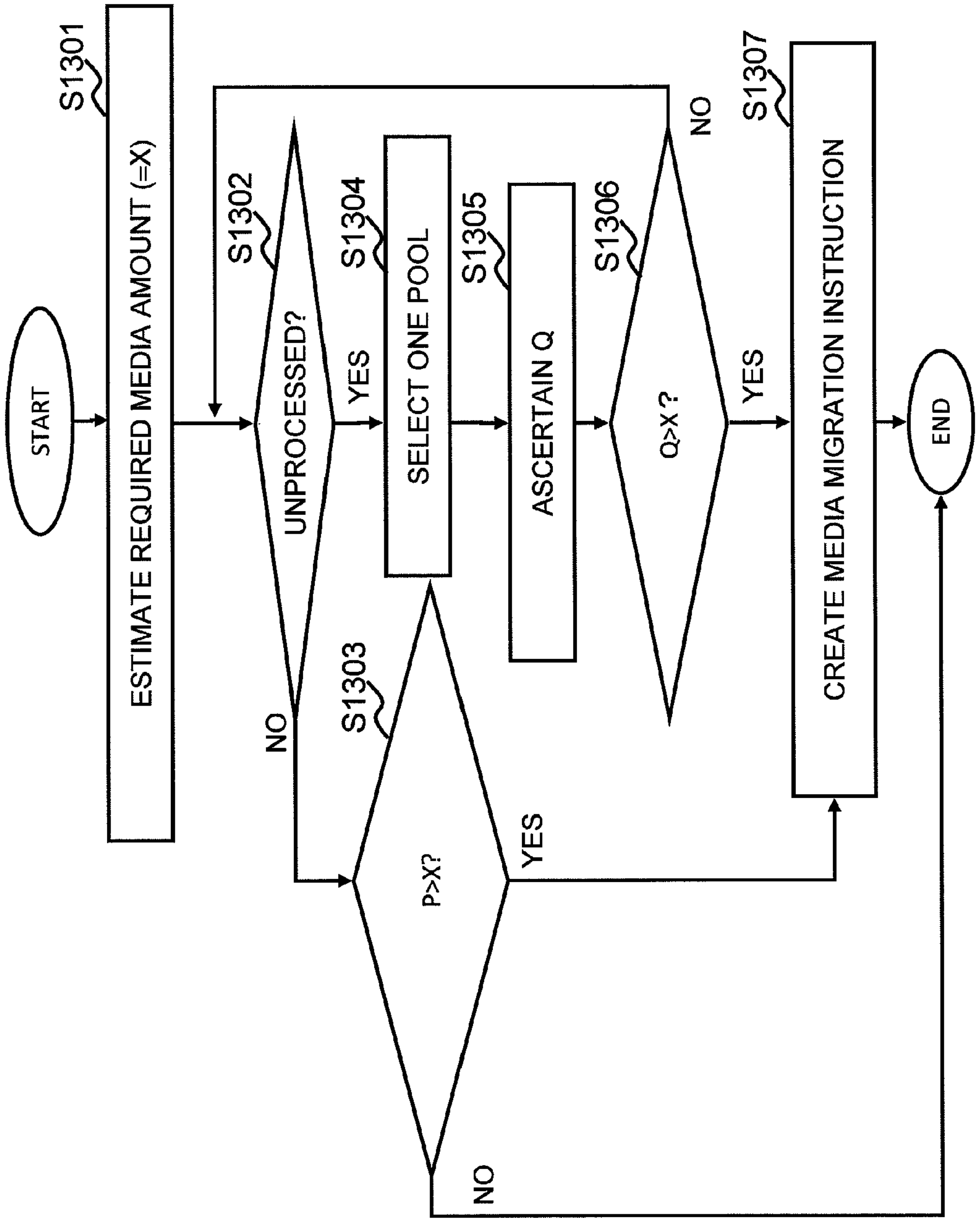
FIG. 15 shows the flow of the procedure at the S1202 in FIG. 14.

FIG. 15 shows the flow of the procedure at the S1202 in FIG. 14.

The program 5020 estimates the amount of required media (=X) (S1301). As more specifically described, for example, the program 5020 acquires the page status management table 402 from the alert-1-storage-apparatus and, with reference to the table 402, obtains how many pages must be added to what tier for achieving the performance target determined at S1201. At this point, X1, X2, and X3 are assumed to be obtained. X1 is the capacity for adding to the higher tier (SSD), that is, the total storage capacity of the number of pages obtained for the higher tier (SSD). X2 is the capacity for adding to the medium tier (SAS), that is, the total storage capacity of the number of pages obtained for the medium tier (SAS). X3 is the capacity for adding to the lower tier (SATA), that is, the total storage capacity of the number of pages obtained for the lower tier (SATA). Note that, instead of acquiring the page status management table 402, the page status management table 402 acquired at S1001 in FIG. 12 may also be used.

The program 5020 determines whether there are any pools not selected at S1304 among the pools which are other than the alert-1-pool and are in the alert-1-storage-apparatus or not (S1302).

If the result of the determination at S1302 is positive, the program 5020 selects a pool not selected yet from the pools other than the alert-1-pool (S1304).

Then, the program 5020 obtains the redundant performance media amount (=Q) (S1305). As more specifically described, for example, the procedure described below is performed.

- The program 5020, for the pool selected at S1304, by the same method as S1301, obtains the required media amount of each tier.
- The program 5020, for the pool selected at S1304, obtains the used capacity of each tier (the total storage capacity of the pages assigned to the virtual area).
- The program 5020, for each tier, by subtracting the obtained used capacity from the obtained required media amount, obtains the redundant performance media amount of each tier. The redundant performance media amount of the higher tier, the medium tier, and the lower tier are referred to as Q1, Q2 and Q3 respectively.

The program 5020 determines whether Q1 is larger than X1 or not, whether Q2 is larger than X2 or not, and whether Q3 is larger than X3 or not (S1306). If at least one of these is negative, the result of this determination is negative, and S1302 is performed again.

If the result of the determination at S1306 is positive, the program 5020 creates a media migration instruction (S1307). The instruction, for example, comprises the information below.

The ID of the migration source pool,

The ID of the migration destination pool (that is, the alert-1-pool), and,

For each tier, the ID of one or more media whose total storage capacity is equal to or larger than the redundant performance media amount (that is, one or more media as the migration target).

Among the above-mentioned information, the ID(s) of one or more media whose total storage capacity is equal to or larger than the redundant performance media amount (one or more media as the migration target) can be identified from the pool management table 403 and the VOL management table 404. Furthermore, for each tier, the migration target medium is the medium with the smallest number of used pages (pages assigned to the virtual area) in the tier. Note that, if the medium comprising the used pages is the migration target medium, in the alert-1-storage-apparatus, after the data in the used pages is migrated to a medium which is not the migration target medium and is in the same tier, the migration target medium is removed from the migration source pool, and is added to the migration destination pool.

If the result of the determination at S1302 is negative, the program 5020, for each tier, determines whether the sum of the previously obtained redundant performance media amount exceeds the required media amount or not (S1303).

If the result of the determination at S1303 is positive, the above-mentioned S1307 is performed. Note that, in this case, the instruction created at S1307 comprises the IDs of multiple migration source pools.

If S1307 is performed, the result of the determination at S1202 in FIG. 14 is positive while, if the result of the determination at S1303 is negative (that is, if S1307 is not performed), the result of the determination at S1202 in FIG. 14 is also negative.

The flow of the procedure at S1202 in FIG. 14 is as above. Note that this procedure, instead of being performed as the sequential procedure for each pool, may also be the concurrent procedure for multiple pools.

Figure 16:
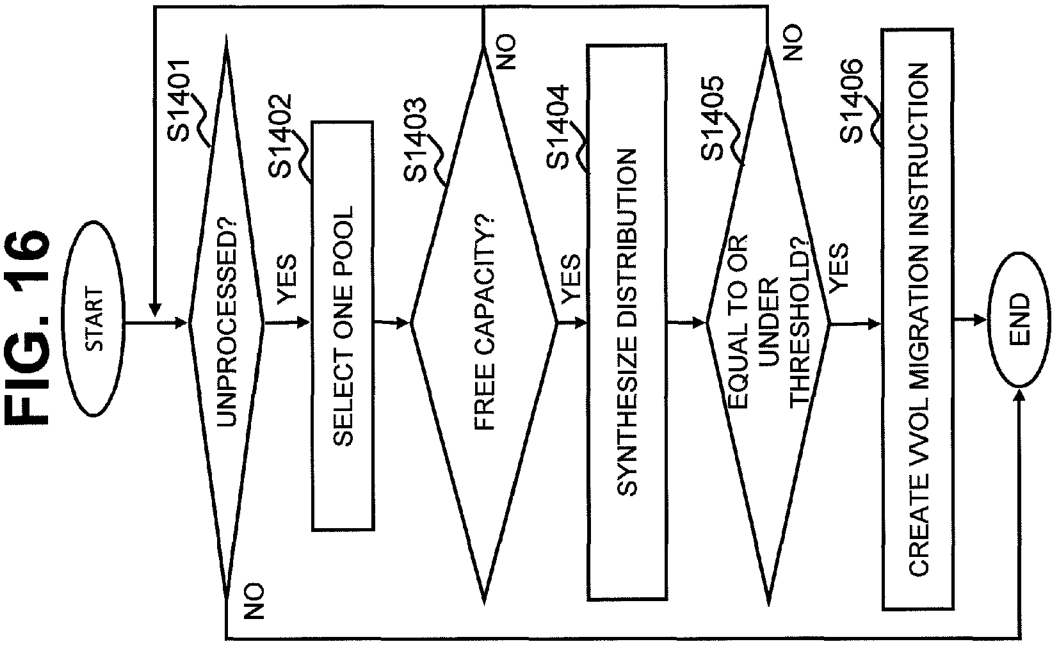
FIG. 16 shows the flow of the procedure at the S1203 in FIG. 14.

FIG. 16 shows the flow of the procedure at S1203 in FIG. 14.

The program 5020 determines whether there are any pools not selected at S1401 among the pools which are other than the alert-1-pool and are in the storage system 103 or not (S1401).

If the result of the determination at S1401 is positive, the program 5020 selects a pool not selected yet from the pools other than the alert-1-pool (S1402).

Then, the program 5020 determines whether the pool selected at S1402 has free capacity equal to or larger than the storage capacity of the alert-1-VVOL or not (S1403). The storage capacity of the alert-1-VVOL can be obtained from the VVOL management table 5040, and the free capacity of the pool selected at S1402 can be obtained from the page status management table 402. Free capacity is the total storage capacity of one or more unused pages (pages not assigned to the virtual area).

If the result of the determination at S1403 is negative, S1401 is performed again.

If the result of the determination at S1403 is positive, the program 5020 synthesizes the distribution of the alert-1-VVOL with the distribution of the pool selected at S1402 (S1404). "Distribution" referred to herein is access distribution, as more specifically described, the distribution complying with the relation between the access frequency and the number of pages. As more specifically described, for example, access distribution, for each access frequency range, shows the total number of pages relevant to the access frequency range. An access frequency range may also be an access frequency itself.

The program 5020, with reference to the access distribution after the synthesis at S1404, determines the performance of each VVOL which satisfies the performance target for the alert-1-VVOL (the target determined at S1201 in FIG. 14) and, at the same time, is made to correspond to the pool selected at S1402 remains equal to or under (SLO×coefficient g) (S1405).

If the result of the determination at S1405 is negative, S1401 is performed again.

If the result of the determination at S1405 is positive, the program 5020 creates a VVOL migration instruction (S1406). The instruction, for example, comprises the information below.

The ID of the migration target VVOL (that is, the alert-1-VVOL),

The ID of the migration destination storage apparatus, and,

The ID of the migration destination pool.

If S1406 is performed, the result of the determination at S1203 in FIG. 14 is positive while, if the result of the determination at S1401 is negative (that is, if S1406 is not performed), the result of the determination at S1203 in FIG. 14 is negative.

The VVOL migration instruction created at S1406 is transmitted to the alert-1-storage-apparatus. At the storage apparatus, in response to the instruction, the pool management program 401 performs the procedure below for all the pages assigned to the migration target VVOL.

The program 401 migrates the data in the pages assigned to the migration target VVOL (migration source pages) to the unused pages (migration destination pages) in the migration destination pool in the migration destination storage apparatus.

The program 401 assigns the migration destination pages, instead of the migration source pages, to the virtual area to which the migration source pages are assigned.

The flow of the procedure at S1203 in FIG. 14 is as above.

Figure 17:
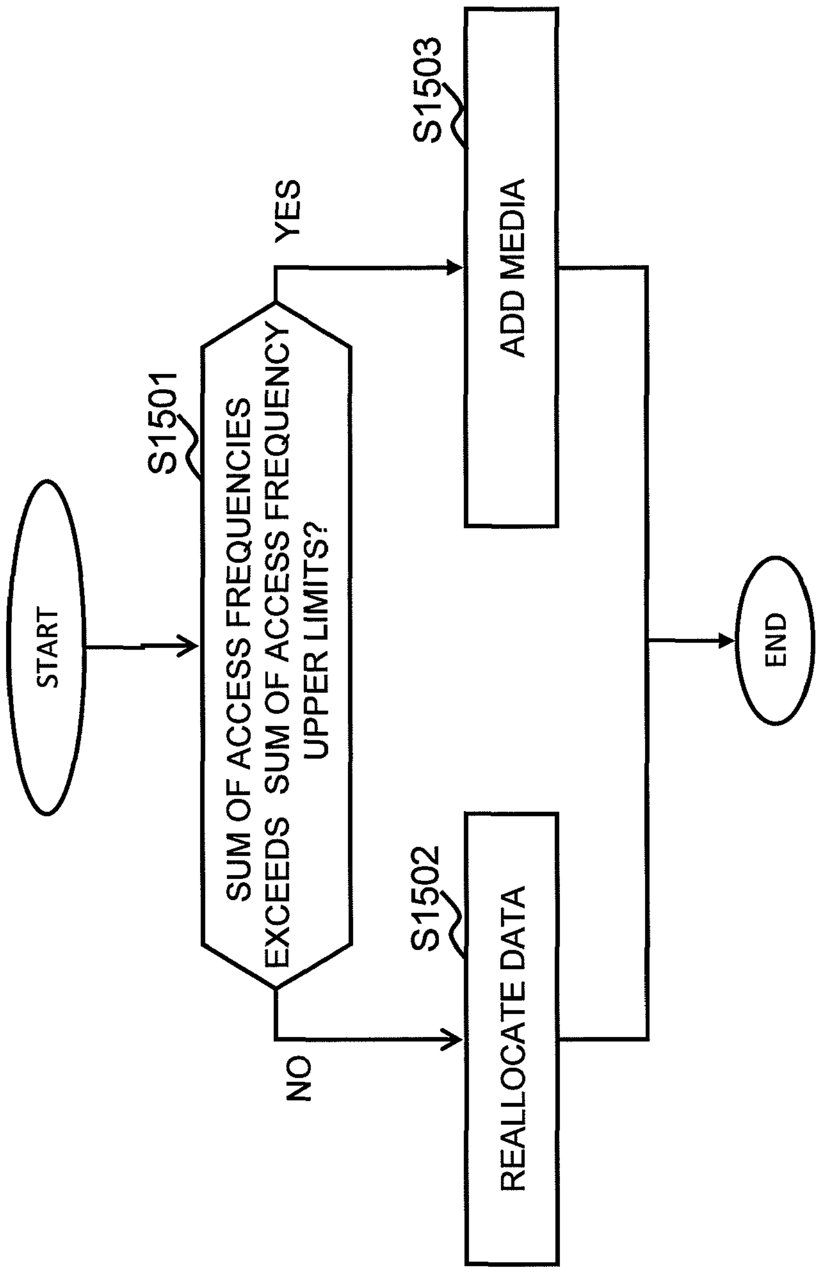
FIG. 17 shows the flow of a procedure performed by the performance management program 5020 which received an alert 2.

FIG. 17 shows the flow of the procedure performed by the performance management program 5020 which received the alert 2 (the alert issued in the second status management procedure). Note that the description below refers to the pool comprising the medium which is the cause of the alert 2 as the "alert-2-pool," and the storage apparatus comprising the alert-2-pool as the "alert-2-storage-apparatus."

The program 5020, with reference to the media status management table 405 (e.g. the table 405 acquired at S1101 in FIG. 13), for each tier in the alert-2-pool, determines whether the sum of the access frequencies exceeds the sum of access frequency upper limits or not (S1501). As more specifically described, for example, the program 5020, for each tier, performs the procedure below.

The program 5020 identifies all the media belonging to the tier from the table 405.

The program 5020, for all the identified media, obtains the sum of the access frequency upper limits 804 and the sum of the access frequencies 805.

The program 5020 determines whether the sum of the access frequencies 805 exceeds the sum of the access frequency upper limits 804 or not.

For the tier(s) about which the result of the determination at S1501 is negative, the program 5020 performs S1502. That is, the program 5020, in one tier, performs data reallocation. For example, so that multiple pieces of data in one tier may be evenly allocated in multiple media belonging to the one tier, the data concentrating on the medium which is the cause of the alert 2 is migrated to the other media in the same tier as that medium.

For the tier(s) about which the result of the determination at S1501 is positive, the program 5020 performs the same procedure as S1205 in FIG. 14. As more specifically described, for example, the program 5020 creates an instruction for adding a capacity to the tier, and transmits the instruction to the alert-2-storage-apparatus. Or [the program] displays the capacity to be added to the tier.

Embodiment 2

The Embodiment 2 of this invention is described below. At this point, the differences from the Embodiment 1 are mainly described, and the description of what is common to the Embodiment 1 is omitted or simplified.

In the Embodiment 1, a VVOL of which a problem is actually occurring (a VVOL whose performance 1007 exceeds the product of the SLO 1004 and the coefficient g) is detected as an inappropriate VVOL while, in the Embodiment 2, a VVOL of which a problem is not actually occurring but is highly likely to occur in the future (a VVOL whose performance 1007 is highly likely to exceed the product of the SLO 1004 and the coefficient g in the future) is detected as an inappropriate VVOL. Then, the data in all the pages assigned to the VVOL is migrated from the pool comprising those pages to another pool. By this method, the possibility of the occurrence of a problem in the future can be reduced.

Hereinafter, the Embodiment 2 is described in details.

FIG. 18 shows the VVOL management table 2004 related to the Embodiment 2.

This table 2004, in addition to the information from 1001 to 1007 which the table 5040 shown in FIG. 10 comprises, comprises the access distribution 1008 for each VVOL. The access distribution 1008, for each access frequency range, shows the total number of pages relevant to the access frequency range and the page rate. The page rate is the rate of the total number of pages relevant to the access frequency range to the total number of pages assigned to the VVOL. In the figure, the size of an access frequency range is 250, but the size of an access frequency range may be any number that is, for example, an integer of 1 or larger.

The VVOL management program 5010, with reference to the page status management table 402, can obtain the access distribution 1008 of each VVOL.

Figure 19:
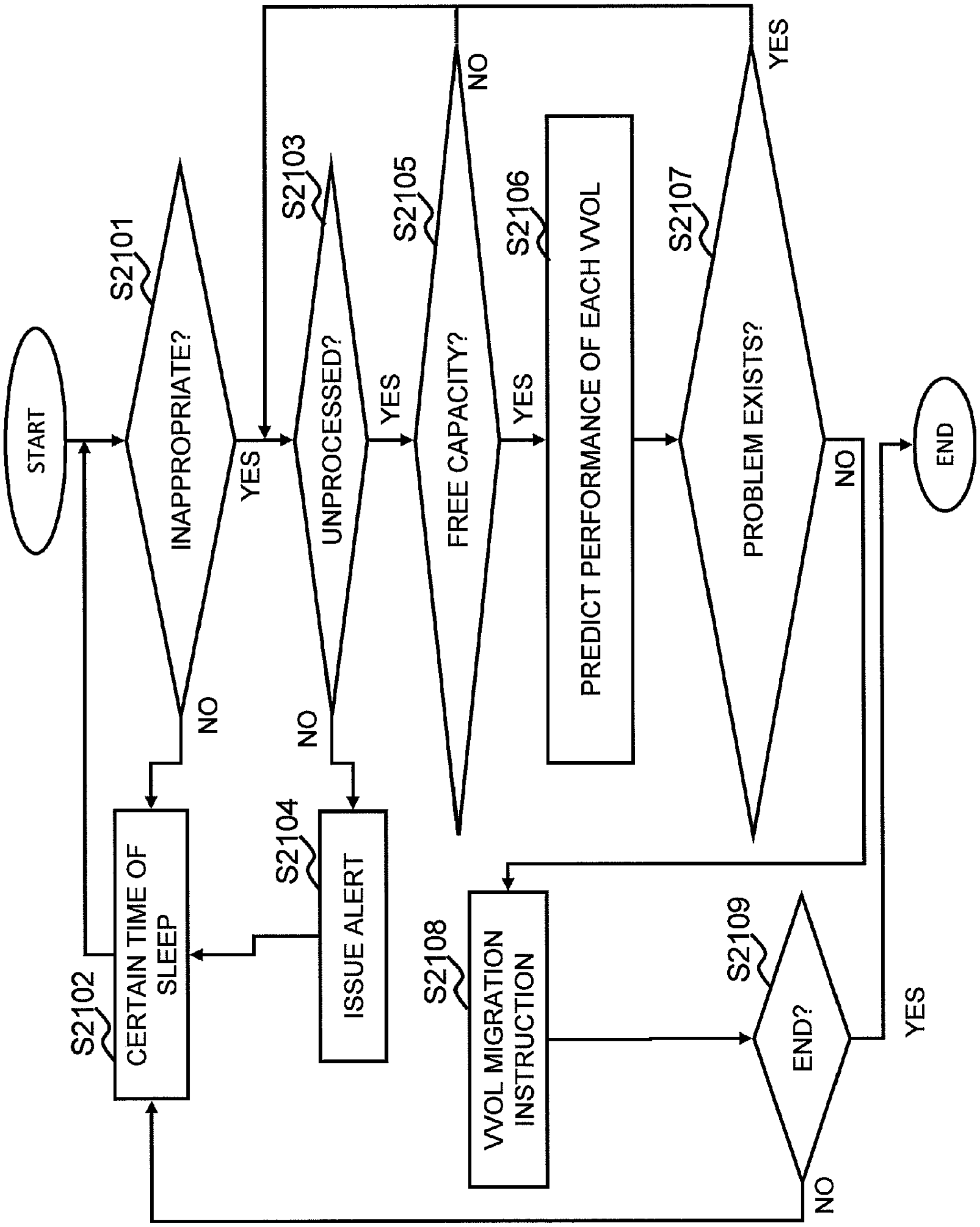
FIG. 19 shows an example of a page IOPS distribution history table 2640.

In the Embodiment 2, the performance management program 5020 performs the procedure shown in FIG. 19.

FIG. 19 shows the flow of the rebalance procedure performed by the performance management program 5020 related to the Embodiment 2.

The program 5020, with reference to the VVOL management table 2004, determines whether an inappropriate VVOL exists or not (S2101). An "inappropriate VVOL" referred to herein is a VVOL whose performance 1007 (average response time) is relatively large though the SLO 1004 is relatively small. For example, if the three VVOLs described below are made to correspond to one pool, the VVOL 11, whose performance 1007 does not exceed the product of the SLO 1004 and the coefficient g, is detected as an inappropriate VVOL. This is because, though the SLO of the VVOL 11 is smaller than the SLO of the VVOL 13, the performance of the VVOL 11 is larger than the performance of the VVOL 13.

VVOL11 SLO: 16.0, performance: 14.1

VVOL12 SLO: 12.0, performance: 4.5

VVOL13 SLO: 18.0, performance: 12.2.

Note that, for detecting an inappropriate VVOL, either one of or both of the (i) and (ii) below may also be applied.

(i) Even if the performance of a first VVOL whose SLO is relatively low is higher than the performance of a second VVOL whose SLO is relatively high, if the difference is equal to or smaller than a specified threshold (a value larger than 0), the first VVOL does not have to be detected as an inappropriate VVOL. As more specifically described, for example, if 2.0 is set as a specified threshold, the VVOL 11 is not detected as an inappropriate VVOL. This is because the difference between the performance of the VVOL 11 and the performance of the VVOL 13 is 1.9, which is under the threshold 2.0.

(ii) The detection of an inappropriate VVOL may also be determined with reference to history information of each VVOL. An example of history information is shown in FIG. 20. The history information 2001 is, for example, the information showing, at what point of time, how many pages in what tier are assigned to the VVOL. Furthermore, the history information 2001 comprises the information 2002 showing the number of used pages of each tier which is aggregated with reference to the number of used pages of each tier at multiple points of time (hereinafter referred to as the aggregate information of each tier). With reference to this history information 2001 (e.g. the aggregate information of each tier 2002), the performance 1007 of the VVOL may be adjusted and, using the adjusted performance 1007, the performance differences among VVOLs may also be obtained. The history information 2001, for example, may also be updated by the VVOL management program 5010 with reference to the pool management table 403. Furthermore, the history information 2001 may also comprise the information 2003 showing the weight coefficient at each point of time (according to FIG. 20, the weight coefficient is larger as the point of time is closer to the present). The performance 1007 of the VVOL, in addition to the number of pages of each tier at each point of time, may also be adjusted using the weight coefficient at each point of time.

If the result of the determination at S2101 is negative, after waiting for a certain length of time (S2102), S2101 is performed again.

If the result of the determination at S2101 is positive, the program 5020 determines whether there are any pools for which S2105 is not performed (unprocessed pools) or not among the pools (the pools in the storage system 103) other than the pool made to correspond to the inappropriate VVOL (S2103).

If the result of the determination at 52103 is negative, the program 5020 issues an alert (S2104). This is because, as described later, though there is an inappropriate VVOL, no pool as an appropriate migration destination can be found. Note that, instead of 52104, it may also be permitted that the program 5020 makes the storage apparatus newly create a pool and that S2105 is performed for the new pool. After S2104, S2102 is performed.

If the result of the determination at S2103 is positive, the program 5020 selects one unprocessed pool, and determines whether the selected pool has larger free capacity than the storage capacity of the inappropriate VVOL or not (S2105). If the result of the determination at S2105 is negative, S2103 is performed again.

If the result of the determination at S2105 is positive, the program 5020, on the assumption that all the pages assigned to the inappropriate VVOL is migrated to the pool selected at S2105, predicts the performance 1007 of each VVOL made to correspond to the selected pool (migration destination pool candidate) (S2106). At S2106, as more specifically described, the procedure below is performed.

(j1) The program 5020, in the storage resource 211 of the management computer 201, prepares the VVOL migration verification table 2101 shown in FIG. 21. The table 2101, for each VVOL made to correspond to the migration destination pool candidate and the inappropriate VVOL (VVOLX), comprises the information below.

VVOL ID 2111: the ID of the VVOL,

Access distribution 2112: the same information as the access distribution 1008 of the VVOL (refer to FIG. 18), Total 2113: the total number of pages assigned to the VVOL (used pages), Media ratio 2114: the rate of the total number of pages of each tier to the total 2113, Performance 2115: the same value as the performance 1007 of the VVOL (refer to FIG. 18), and SLO 2116: the same value as the performance 1004 of the VVOL (refer to FIG. 18).

(j2) The program 5020, with reference to all the access distributions 2112 registered to the table 2101, obtains the total number of used pages of each access frequency range. For example, if the VVOL IDs 2111 registered to the table 2101 are four, that is, VVOL1, VVOL2, VVOL3, and VVOL4 and, at the same time, if the access frequency ranges "500-749" are 3000, 2000, 2000, and 1500, the total number of used pages in the access frequency ranges "500-749" amounts to 3000+2000+2000+1500=8500.

(j3) The program 5020 assigns the page groups of each tier in the migration destination pool candidate in accordance with the total number of used pages of each access frequency range. In that case, it is assumed that the pages of the higher tier are preferentially assigned to the virtual area to which the pages with the higher access frequency are assigned. As more specifically described, for example, it is assumed that the number of pages configuring the higher tier is 10000, that the number of pages configuring the medium tier is 40000, and that the number of pages configuring the lower tier is 50000. If the total number of used pages of the first highest access frequency range "2500 and larger" is 6000, it is assumed that, in 6000 pages of the 10000 pages in the higher tier, the data in the 6000 pages whose access frequencies belong to the access frequency range "2500 and larger" is stored. If the total number of used pages of the second highest access frequency range "from 2250 to 2249" is 9000, it is assumed that, in the remaining 4000 pages of the 10000 pages in the higher tier, the data in 4000 pages of the 8000 pages whose access frequencies belong to the access frequency range "from 2250 to 2249" is stored and that, in the 5000 pages of the 40000 pages in the medium tier, the data in the remaining 5000 pages whose access frequencies belong to the access frequency range "from 2250 to 2249" is stored. In that case, the 4000 pages in the higher tier are assigned with reference to the ratio of the number of used pages (VVOL1: VVOL2: VVOL3: VVOLX) whose access frequencies belong to the access frequency range "from 2250 to 2249."

(j4) The program 5020, with reference to the result of the above-mentioned (j3), updates the media ratio 2114 for the VVOLs from 1 to 3 and the VVOLX. The updated values are shown after the signs "->" in FIG. 21.

(j5) The program 5020, for the VVOLs from 1 to 3 and the VVOLX, with reference to the updated media ratio 2114, obtains the performance 2115 on the assumption that migration was performed. The values of the performance 2115 are shown after the signs "->" in FIG. 21. As the VVOLX is assumed to be newly made to correspond to the migration destination pool candidate, by the influence of newly making the correspondence to the VVOLX, the performances of the VVOLs from 1 to 3 are deteriorated as shown in FIG. 21 (the average response time becomes longer).

The program 5020, with reference to the VVOL migration verification table 2101, determines whether either of the (a) and (b) VVOLs below exists in the VVOLs (according to the example above, the VVOLs from 1 to 3 and the VVOLX) made to correspond to the migration destination candidate pool or not (S2107), (a) the VVOL whose performance 2115 exceeds the threshold of the SLO 2116 and the coefficient g, and (b) the above-mentioned inappropriate VVOL in the Embodiment 2 (that is, the VVOL whose performance 2115 (average response time) is relatively large though the SLO 2116 is relatively small.)

If the result of the determination at S2107 is negative, S2103 is performed again.

If the result of the determination at S2107 is positive, the program 5020 creates a VVOL migration instruction comprising the information below, and transmits the instruction to the storage apparatus comprising the inappropriate VVOL (S2108).

The ID of the migration target VVOL (that is, the inappropriate VVOL),

The ID of the storage apparatus comprising the migration destination pool candidate, and The ID of the migration destination pool (migration destination pool candidate).

In response to the VVOL migration instruction, the data in all the pages assigned to the inappropriate VVOL is migrated to the migration destination pool. Note that the instruction may include the information complying with the prediction at S2106. For example, the information showing that, among all the pages assigned to the inappropriate VVOL, the data in the pages whose access frequencies belong to the access frequency range "2500 or larger" is migrated to the pages in the higher tier of the migration destination pool may be included in the VVOL migration instruction.

If a termination instruction is input by the administrator (S2109: YES), this rebalance procedure is stopped. If no termination instruction is input by the administrator (S2109: NO), a certain period after S2108 is performed (S2102), S2101 is performed again.

The description of the Embodiment 2 is as above.

Note that, in the Embodiment 2, an inappropriate VVOL, if only the definition indicates a VVOL in which a problem is highly likely to occur in the future, instead of or in addition to [the definition as] a VVOL whose performance (average response time) is relatively large though the SLO is relatively small, may be under another definition. For example, an inappropriate VVOL may be a VVOL whose SLO is large but the performance is small. As more specifically described, for example, a VVOL whose performance is smaller than 50% of the SLO may be detected as an inappropriate VVOL. In this case, if the SLO is 18.0%, a VVOL whose average response time is 9.0 or smaller is an inappropriate VVOL.

Embodiment 3

The Embodiment 3 of this invention is described below. At this point, the differences from the Embodiment 2 are mainly described, and the description of what is common to the Embodiment 2 is omitted or simplified.

In the Embodiment 3, the rebalance procedure in which multiple VVOLs whose SLOs and access distributions are both similar are made to correspond to the same pool is performed. The rebalance procedure is performed by the performance management program 5020 in the management computer 201.

Figure 22:
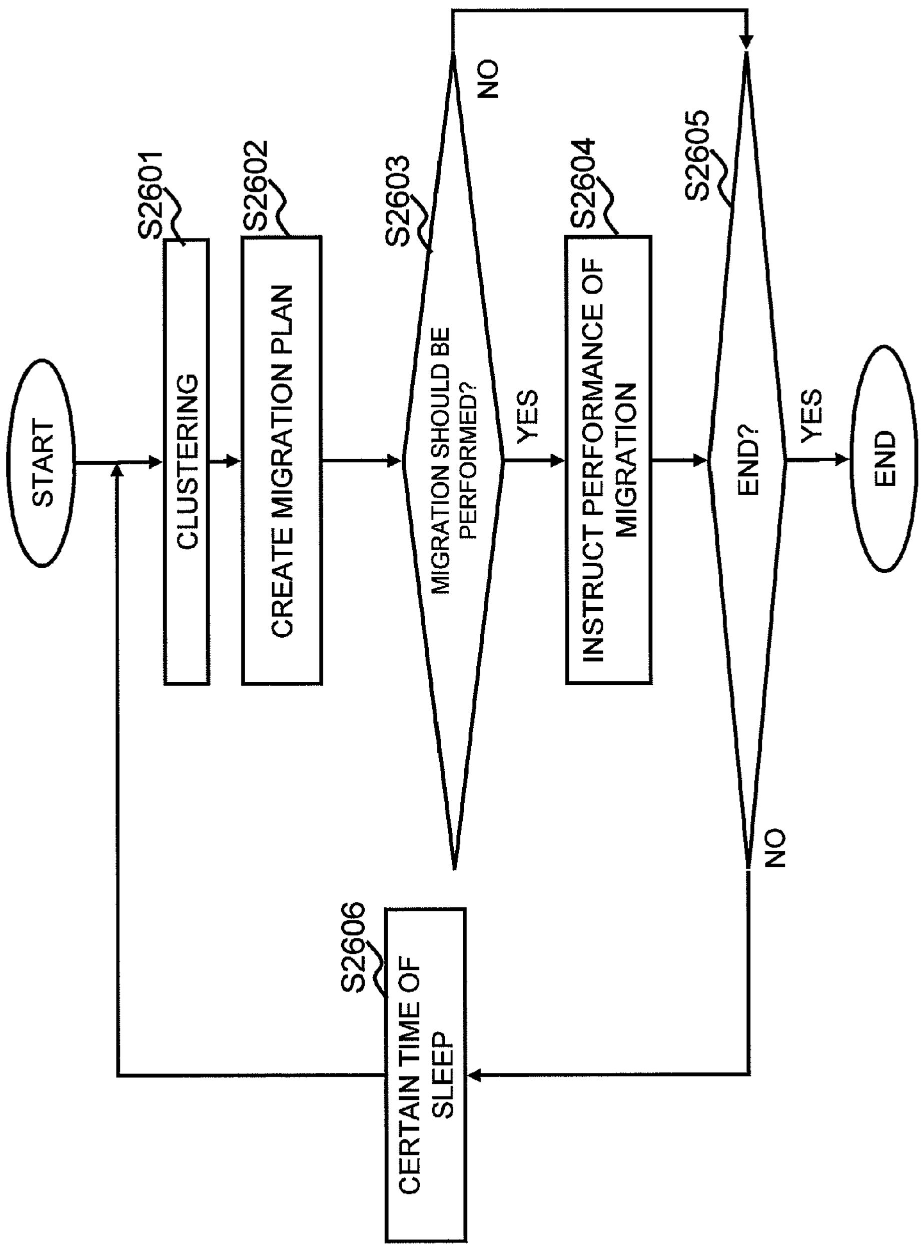
FIG. 22 shows the flow of a rebalance procedure performed by the performance management program 5020 related to the Embodiment 3.

FIG. 22 shows the flow of the rebalance procedure performed by the performance management program 5020 related to the Embodiment 3.

The program 5020 performs clustering, that is, grouping for ensuring that multiple VVOLs whose SLOs and access frequencies are both similar belong to the same group (S2601). As more specifically described, for example, the procedure below (m1) and (m2) are performed.

(m1) The program 5020 performs grouping of all the VVOLs in the storage system 103 (N units of VVOLs) in units of M units of VVOLs with similar SLOs (N>M, N and M are specified values and natural numbers). For example, in case of N=1000 and M=100, 100 VVOL groups are made, Each VVOL group at this step is referred to as a "VVOL group x." As for this (m1), grouping is performed in units of M units of VVOLs with close SLOs, and therefore, the maximum value (and the minimum value) of the SLO of a certain VVOL group x might be different from the maximum value (and the minimum value) of the SLO of another VVOL group x.

(m2) The program 5020, for each VVOL group x, performs grouping of M units of VVOLs in units of P units of VVOLs with similar access distributions (M>P, P is a specified value and a natural number). Each VVOL group at this step is referred to as a "VVOL group y." That is, N units of VVOLs in the storage system are grouped into multiple VVOL groups y. Note that, as the degrees of similarity, error sums of squares are applied. Grouping is performed for minimizing the error sums of squares. If, for example, VVOL groups x configured of 4 units of VVOLs (VVOL1 to VVOL4) are grouped by 2 units of VVOLs, grouping is performed as below.

Figure 24:
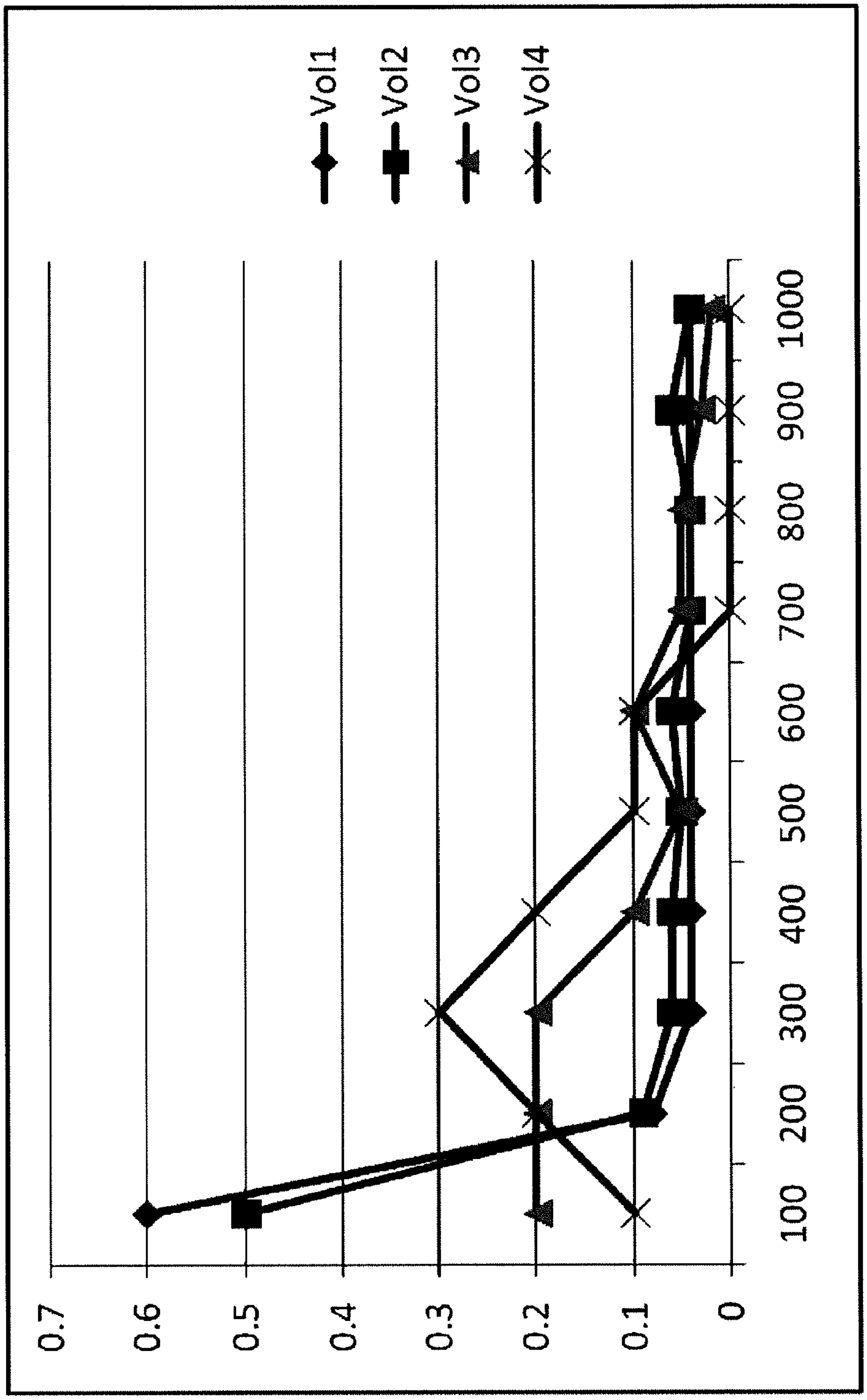
FIG. 24 is a graph of the access distribution in FIG. 23.

The access distributions of the VVOLs from 1 to 4 are assumed to be normalized by "1" as shown in FIG. 23. Furthermore, the graph of the distribution of FIG. 23 is shown in FIG. 24 (in FIG. 24, a VVOL is referred to as a "vol").

The degree of similarity between the respective VVOLs is obtained. The degree of similarity is, for example, a square sum of residual errors (a square sum of errors among the number of used pages (normalized values) of each access frequency range). For example, the degree of similarity of the VVOL1 and the VVOL2 is $$(0.6-0.5)^2+(0.08-0.09)^2+\ldots+(0.04-0.06)^2=0.0118.$$

The degrees of similarity between the respective VVOLs are as described below. The accurate degrees of similarity are shown in parentheses, and the values of the accurate degrees of similarity rounded to two decimal places are shown outside the parentheses.

VVOL1-VVOL2: 0.01 (0.0118)
VVOL1-VVOL3: 0.21 (0.208)
VVOL1-VVOL4: 0.37 (0.3712)
VVOL2-VVOL3: 0.13 (0.1264)
VVOL2-VVOL4: 0.26 (0.2618)
VVOL3-VVOL4: 0.04 (0.0388)

The program 5020 obtains the combination with the smallest sum of degrees of similarity. According to the example above, the combination of VVOL1-VVOL2: 0.01 and VVOL3-VVOL4: 0.04, which amounts to 0.5, is the smallest. Therefore, the program 5020 determines to group the VVOLs from 1 to 4 into a VVOL group y configured of the VVOLs 1 and 2 and a VVOL group y configured of the VVOLs 3 and 4. Note that the access distributions of the VVOLs 1 and 2 are more similar with each other and so is the access distributions of the VVOLs 3 and 4 than the access distribution of the VVOL 1 or 2 and the access distribution of the VVOL 3 or 4, as is obvious from FIG. 24.

FIG. 22 is referred to again. The program 5020 creates a migration plan (S2602). The plan is the plan which satisfies the conditions described below.

The plan in which the amount of data migrated by the VVOL migration is the smallest. As more specifically described, for example, the program 5020, with reference to the used capacity 1005 in the VVOL management table 2004 (refer to FIG. 18), creates a migration plan in which the total amount of migrated data, not the number of migration target VVOLs, is the smallest.

Only one VVOL group y is made to correspond to one pool. That is, to one pool, VVOLs whose SLOs and access distributions are not similar are not made to correspond.

The program 5020 determines whether to perform the migration complying with the plan created at S2602 or not (S2603). For example, the program 5020 determines whether performing the migration complying with the plan is free from causing any VVOLs whose performance exceeds the product of the SLO and the coefficient g or not.

If the result of the determination at S2603 is negative, S2604 is skipped and S2605 is performed.

If the result of the determination at S2603 is positive, the program 5020 creates an instruction for a VVOL migration complying with the plan created ad S2602. For example, the instruction is created for each migration target VVOL or for each storage apparatus comprising the migration target VVOLs. The program 5020 transmits the created VVOL migration instruction to the storage apparatus comprising the migration target VVOLs. By this method, the migration complying with the plan created at S2602 is performed.

The program 5020, if a termination instruction is input by the administrator (S2605: YES), terminates this rebalance procedure or, if no termination instruction is input by the administrator (S2605: NO), waits for a certain period (S2606), and performs s2601 again.

The description of the Embodiment 3 is as above.

Note that, as for at least one of a VVOL group x and a VVOL group y, the number of VVOLs does not have to be a specified value. For example, it may also be permitted that multiple SLO ranges are defined and that, in an SLO range, a VVOL group x is configured of all the VVOLs belonging to the SLO range. That is, multiple VVOL groups x may also be two or more VVOL groups x with the different numbers of VVOLs. Similarly, multiple VVOL groups y may also be two or more VVOL groups y with the different numbers of VVOLs.

Furthermore, a migration plan may be determined in accordance with, instead of or in addition to making the total amount of migration target data as small as possible, the access distribution of the VVOL groups y and the configuration of each pool (e.g. the capacity of each tier). As more specifically described, for example, a plan may be created in which, to a VVOL group y to which more pages whose access frequencies are high are assigned than the other VVOL groups y, a pool whose capacity of the higher tier is larger (or whose ratio in the pool is larger) than the pools to which the other VVOL groups y are made to correspond while, to a VVOL group y to which more pages whose access frequencies are small are assigned than the other VVOL groups y, a pool whose capacity of the lower tier is larger (or whose ratio in the pool is larger) than the pools to which the other VVOL groups y are made to correspond. In other cases, for example, it may also be permitted that the program 5020, in creating a plan, determines the migration destination pool and, if over-provisioning (or insufficient performance or capacity) is predicted from the access distribution of a VVOL group y, determines to what tier of what pool how much capacity should be added or deleted (e.g. what medium should be added or deleted). The determined contents may be reported to the administrator before or after performing the migration at s2604.

Embodiment 4

In the Embodiment 4, an SLO is prepared for each access source, not for each VVOL.

FIG. 25 shows the VVOL management table 2701 related to the Embodiment 4.

In this embodiment, the access source is an application program performed in the host device 101. The table 2701, for each application program, in addition to the information 1001, 1002, . . . which are described with reference to FIG. 18, comprises the information below.

APP ID 2511: the ID of the application program, and

LBA range: the information showing the LBA range of the VVOL which can be accessed from the application program.

In the table 2701, the SLO 1004 and the performance 1007 (not shown in FIG. 25) are the SLO and the performance of the access source. Therefore, in the Embodiment 4, instead of an inappropriate VVOL, an inappropriate application program is supposed to be detected. If an inappropriate application program is detected, the rebalance procedure in at least one embodiment among the Embodiments from 1 to 3 is performed, which makes the inappropriate application program into an appropriate application program.

According to FIG. 25, there is a case in which one application program (e.g. APP1) can access multiple VVOLs (e.g. VVOL1, VVOL3) (hereinafter referred to as a first case), and there is another case in which multiple application programs (e.g. APP3, APP4) share one VVOL (e.g. VVOL2) (hereinafter referred to as a second case). If a VVOL is shared by multiple application programs, to what LBA range of the VVOL what application program can access is defined in the table 2701.

In the first case, for each VVOL corresponding to the one application program, the procedure complying with at least one of the Embodiments from 1 to 3 can be performed.

In the second case, for the VVOL is shared by the multiple application programs (the VVOL to which multiple SLOs 1004 are made to correspond), by using any one of the SLOs 1004 (e.g. the smallest SLO 1004 of the multiple SLOs 1004 made to correspond), the procedure complying with at least one of the Embodiments from 1 to 3 can be performed.

The access source, instead of or in addition to an application program, may also be a virtual machine or a host device.

Though some embodiments of this invention were described above, this invention is not limited to any particular embodiments herein disclosed and, it is obvious that this invention also comprises any changes, modifications or equivalents within the spirit and scope hereof. For example, if an access to the virtual area occurs, regardless of whether the pages assigned to the virtual area were accessed or not, the access frequency 505 corresponding to the virtual area may be updated. Furthermore, if an access to the virtual area is the identified type of access (e.g. in case of a read), the access frequency 505 corresponding to the virtual area does not have to be updated.

Reference Sign List

101: host device, 201: management computer, 103: storage system

The invention claimed is:

1. A management system of a storage system, which receives an access command from an access source, wherein the storage system comprises multiple virtual volumes, multiple pools, and a controller, wherein each virtual volume is a virtual logical volume configured of multiple virtual areas, wherein each pool is a storage area configured of multiple actual area groups of different performances, wherein the controller, (a) receives the access command, (b) accesses an actual area in a case where this actual area has not been assigned to a virtual area identified from the access command, and (c) in a case where an actual area is not assigned to the identified virtual area, assigns an actual area from a pool, from among the multiple pools, which has been made to correspond to a virtual volume having the identified virtual area, and accesses the assigned actual area, and wherein the controller manages pool condition information, which is information showing which actual area is assigned to which virtual area and showing an access load related to a virtual area, wherein the management system comprises:

a storage resource; and a processor coupled to this storage resource, wherein the storage resource stores, with respect to each virtual volume, management information showing a performance requirement related to an access from the access source to the virtual volume and a performance related to an access from the access source to the virtual volume, wherein performance of the virtual volume is performance identified based on the pool condition information, and wherein the processor, (A) identifies, based on this management information, a virtual volume whose condition is inappropriate from among the multiple virtual volumes, and (B) performs a migration procedure related to the pool that has been made to correspond to the identified virtual volume to change the condition of the identified virtual volume from the inappropriate condition to an appropriate condition;

and:

wherein the migration process performed in the (B) is for adding a first storage capacity from another pool to the pool that has been made to correspond to the virtual volume identified in the (A), wherein the first storage capacity is a storage capacity in excess of the performance of the virtual volume that has been made to correspond to an other pool, and, in addition, is a storage capacity that is equal to or greater than a second storage capacity, and wherein the second storage capacity is a storage capacity added to the pool that has been made to correspond to the virtual volume identified in the (A) so that the performance of the virtual volume identified in the (A) satisfies the performance requirement of this virtual volume.

2. A management system according to claim 1, wherein the virtual volume identified in the (A) is a virtual volume whose performance satisfies the performance requirement, but is most likely to cease to satisfy the performance requirement in the future, and wherein the migration procedure performed in the (B) is a procedure in which data in all the actual areas that are assigned to the virtual volume identified in the (A) is migrated from a first pool, which is a pool that has been made to correspond to the virtual volume identified in the (A), to a second pool, which is a different pool than the first pool, and, in addition, is a procedure for making the virtual volume identified in the (A) correspond to the second pool in place of the first pool.

3. A management system according to claim 2, wherein the second pool is a pool in which, even when the virtual volume identified in the (A) is made to correspond to this second pool, a virtual volume, which is already being made to correspond to this second pool, is to be neither a virtual volume whose performance does not satisfy the performance requirement, nor a virtual volume whose performance satisfies the performance requirement, but is most likely to cease to satisfy the performance requirement in the future.

4. A management system according to claim 3, wherein the processor identifies, with respect to each virtual volume, an access condition showing a number of actual areas for each access load range based on the pool condition information, and wherein wherein the processor, in the (B), (b1) decides on a second pool candidate from among pools other than the first pool, and (b2) determines whether or not to use the second pool candidate as the second pool based on the access condition of the virtual volume that is already assigned to the second pool candidate, the access condition of the virtual volume identified in the (A), which is scheduled to be assigned to the second pool candidate, and the number of actual areas of each actual area group that configures the second pool candidate, wherein in the (b2), assumption being made that an actual area, which, in an actual area group, has higher performance is assigned to a virtual area to which is assigned an actual area with a high access load range, and wherein in a case where a result of the determination in the (b2) is affirmative, the second pool candidate being the second pool.

5. A management system according to claim 2, wherein the virtual volume identified in the (A) is a virtual volume, which is in the multiple virtual volumes that have been made to correspond to the first pool, and which has performance requirement that is higher than the performance requirement of another virtual volume, but exhibits performance that is lower than the performance of an other virtual volume.

6. A management system according to claim 1, wherein the processor identifies, based on the pool condition information, an access condition showing the number of actual areas for each access load range with respect to each virtual volume, and wherein the virtual volume identified in the (A) is a virtual volume of the multiple virtual volumes that have been made to correspond to a pool to which this virtual volume has been made to correspond, and, of these multiple virtual volumes, is the virtual volume, whose performance requirement and access condition differ beyond allowable ranges in comparison with the performance requirement and access condition of an other virtual volume.

7. A management system according to claim 6, wherein the migration process performed in the (B) is for causing multiple virtual volumes having similar performance requirement and access condition to correspond to one pool, and in this procedure, in a case where a virtual volume, which has been made to correspond to a pool other than this one pool, is made to correspond to this one pool, procedure is carried out for migrating the data in all the actual areas assigned to this virtual volume from an other pool to the one pool.

8. A management system according to claim 7, wherein, in the (B), the pool, to which the multiple virtual volumes having similar performance requirements and access conditions are made to correspond, is the pool that has the least total amount of data to be migrated.

9. A management system according to claim 1, wherein the virtual volume identified in the (A) is a virtual volume whose performance does not satisfy the performance requirement.

10. A management system according to claim 9, wherein the processor, in the (B), (b1) determines whether or not the condition of the virtual volume identified in the (A) changes from an inappropriate condition to an appropriate condition by performing a procedure for adding a first storage capacity from another pool to the pool that has been made to correspond to the identified virtual volume in the (A), and (b2) in a case where a result of the determination in the (b1) is negative, determines whether or not the condition of the identified virtual volume in the (A) changes from an inappropriate condition to an appropriate condition when procedure is carried out in which the data in all the actual areas assigned to the virtual volume identified in the (A) is migrated from a first pool, which is the pool that has been made to correspond to the virtual volume identified in the (A), to a second pool, which is a pool other than the first pool, and, in addition, the virtual volume identified in the (A) is made to correspond to the second pool in place of the first pool, and wherein the first storage capacity is a storage capacity in excess of the performance of the virtual volume that has been made to correspond to the other pool, and, in addition, is a storage capacity that is equal to or greater than a second storage capacity, and wherein the second storage capacity is a storage capacity to be added to the pool that has been made to correspond to the virtual volume identified in the (A) so that the performance of the virtual volume identified in the (A) satisfies the performance requirement of this virtual volume.

11. A management system according to claim 1, wherein the management information has information, which shows a performance requirement and a performance with respect to each access source, and, in addition, shows which one or more access sources uses which virtual volume, wherein in the (A), in place of a virtual volume, an access source whose condition is inappropriate is identified from among multiple access sources, and wherein in the (B), a migration process related to a pool that has been made to correspond to a virtual volume, which is to be accessed from the identified access source, is performed to change the condition of the identified access source from an inappropriate condition to an appropriate condition.

12. A management method of a storage system, which receives an access command from an access source, wherein the storage system comprising multiple virtual volumes, multiple pool s, and a controller, wherein each virtual volume being a virtual logical volume configured from multiple virtual areas, wherein each pool being a storage area configured from multiple actual area groups of different performances, wherein the controller, (a) receives the access command, (b) accesses an actual area in a case where this actual area is assigned to a virtual area identified from the access command, and (c) in a case where the actual area has not been assigned to the identified virtual area, to assign an actual area from a pool, from among the multiple pools, which has been made to correspond to a virtual volume having the identified virtual area, and to access the assigned actual area, and wherein the controller being configured to manage pool condition information, which is information showing which actual area has been assigned to which virtual area and an access load related to a virtual area, wherein the management method comprising:

(A) identifying, from among the multiple virtual volumes, a virtual volume whose condition is inappropriate based on management information showing, with respect to each virtual volume, a performance requirement related to an access from the access source to the virtual volume and a performance related to an access from the access source to the virtual volume; and (B) performing a migration procedure related to the pool that has been made to correspond to the identified virtual volume to change the condition of the identified virtual volume from an inappropriate condition to an appropriate condition;

wherein the migration process performed in the (B) is for adding a first storage capacity from another pool to the pool that has been made to correspond to the virtual volume identified in the (A), wherein the first storage capacity is a storage capacity in excess of the performance of the virtual volume that has been made to correspond to an other pool, and, in addition, is a storage capacity that is equal to or greater than a second storage capacity, and wherein the second storage capacity is a storage capacity added to the pool that has been made to correspond to the virtual volume identified in the (A) so that the performance of the virtual volume identified in the (A) satisfies the performance requirement of this virtual volume.

* * * * *